US012812637B2

(12) United States Patent
Bagheri et al.

(10) Patent No.: US 12,812,637 B2
(45) Date of Patent: Nov. 24, 2026

(54) REPORTING A SCHEDULING-RELATED PARAMETER FOR A LEARNING MODEL

(71) Applicant: Lenovo (Singapore) Pte Ltd, Singapore (SG)

(72) Inventors: Hossein Bagheri, Urbana, IL (US); Joachim Löhr, Wiesbaden (DE); Vahid Pourahmadi, Munich (DE); Vijay Nangia, Woodridge, IL (US)

(73) Assignee: Lenovo (Singapore) Pte Ltd., Singapore (SG)

( * ) Notice: Subject to any disclaimer, the term of this patent is extended or adjusted under 35 U.S.C. 154(b) by 331 days.

(21) Appl. No.: 18/677,691

(22) Filed: May 29, 2024

(65) Prior Publication Data

US 2025/0374269 A1 Dec. 4, 2025

(51) Int. Cl.

*H04W 72/1268* (2023.01)
*H04W 28/02* (2009.01)
*H04W 72/542* (2023.01)

(52) U.S. Cl.

CPC ... *H04W 72/1268* (2013.01); *H04W 28/0278* (2013.01); *H04W 72/542* (2023.01)

(58) Field of Classification Search

None
See application file for complete search history.

(56) References Cited

U.S. PATENT DOCUMENTS

| | | | | |
|---|---|---|---|---|
| 2023/0077258 | A1* | 3/2023 | Shen | G06N 3/082 |
| 2023/0282201 | A1* | 9/2023 | Bissell | G06F 40/30 704/270 |
| 2024/0205956 | A1* | 6/2024 | Tayamon | H04W 72/542 |
| 2025/0056313 | A1* | 2/2025 | Yu | H04W 28/06 |
| 2025/0358684 | A1* | 11/2025 | Kanamarlapudi | H04W 28/18 |
| 2025/0374269 | A1* | 12/2025 | Bagheri | H04W 28/0278 |
| 2026/0148163 | A1* | 5/2026 | Crabtree | G06F 12/023 |

OTHER PUBLICATIONS

"Physical layer procedures for data", 3rd Generation Partnership Project; Technical Specification Group Radio Access Network, 3GPP TS 38.214 V16.7.0, 3GPP Organizational Partners, Valbonne, France [retrieved Feb. 2, 2022]. Retrieved from the Internet <http://www.3gpp.org>., Sep. 2021, 172 Pages.

(Continued)

*Primary Examiner* — Faiyazkhan Ghafoerkhan
(74) *Attorney, Agent, or Firm* — FIG. 1 Patents

(57) ABSTRACT

Various aspects of the present disclosure relate to reporting a scheduling-related parameter for a learning model. Scheduling-related parameters predicted by a network equipment (e.g., a base station) using a learning model are shared with a user equipment (UE), and the UE reports (e.g., to a network equipment, such as a base station) a correction to the predicted parameters if the prediction error satisfies a threshold. The prediction error is, for example, a difference (e.g., the absolute value of the difference) between a predicted scheduling-related parameter and the actual value of the scheduling-related parameter at the UE. The prediction error satisfies a threshold, for example, if the prediction error is greater than the threshold, or if the prediction error is greater than or equal to the threshold.

20 Claims, 10 Drawing Sheets

(56) References Cited

OTHER PUBLICATIONS

"Technical Specification Group Radio Access Network", 3GPP TS 38.213 V16.1.0, 3rd Generation Partnership Project [retrieved Nov. 2, 2022]. Retrieved from the Internet <https://portal.3gpp.org/desktopmodules/Specifications/SpecificationDetails.aspx?specificationld=3215>., Mar. 2020, 156 pages.
3GPP , "Physical layer procedures", 3GPP TS 36.213 v15.6.0 Technical Specification Group Radio Access Network; Evolved Universal Terrestrial Radio Access (E-UTRA) Release 15, Jun. 1, 2019, 545 pages.
3GPP , "Radio Resource Control (RRC) protocol specification", 3GPP TS 38.331 V18.1.0, retrieved from the internet on Aug. 14, 2024, <https://www.etsi.org/deliver/etsi_ts/138300_138399/138331/18.01.00_60/ts_138331v180100p.pdf/>, Mar. 2024, 1649 pages.
3rd Generation Partnership Proje , "Evolved Universal Terrestrial Radio Access (E-UTRA)", 3GPP TS 36.322 V18.0.0, [retrieved Aug. 18, 2024]. Retrieved from the Internet <https://portal.3gpp.org/desktopmodules/Specifications/SpecificationDetails.aspx?specificationld=2438>, Mar. 2024, 47 pages.
3rd Generation Partnership Proje , "Medium Access Control (MAC) protocol specification", 3rd Generation Partnership Project, Technical Specification Group Radio Access Network, 3GPP, TS 38.321, V17 .3.0, Technical Specification, Release 17, Jan. 13, 2023, 251 pages.
3rd Generation Partnership Proje , "User Equipment (UE) radio transmission and reception, Part 1", 3GPP TS 38.101-1 V18.4.0. [retrieved Aug. 18, 2024]. Retrieved from the Internet <https://portal.3gpp.org/desktopmodules/Specifications/SpecificationDetails.aspx?specificationld=3283>, Dec. 2023, 1011 pages.
3rd Generation Partnership Proje , "User Equipment (UE) radio transmission and reception, Part 2", 3GPP TS 38.101-2, V18.5.0, [retrieved Aug. 18, 2024]. Retrieved from the Internet <https://arxiv.org/pdf/2203.12614.pdf>, Mar. 2024, 248 pages.
3rd Generation Partnership Proje , "User Equipment (UE) radio transmission and reception; Part 3: Range 1 and Range 2 Interworking operation with other radios", 3GPP TS 38. 101-3 V18.5.0, [retrieved Aug. 18, 2024]. Retrieved from the Internet <https://portal.3gpp.org/desktopmodules/Specifications/SpecificationDetails.aspx?specificationld=3285>, Mar. 2024, 1307 pages.

* cited by examiner

REPORTING A SCHEDULING-RELATED PARAMETER FOR A LEARNING MODEL

TECHNICAL FIELD

The present disclosure relates to wireless communications, and more specifically to reporting a scheduling-related parameter for a learning model.

BACKGROUND

A wireless communications system may include one or multiple network communication devices, such as base stations, which may support wireless communications for one or multiple user communication devices, which may be otherwise known as user equipment (UE), or other suitable terminology. The wireless communications system may support wireless communications with one or multiple user communication devices by utilizing resources of the wireless communication system (e.g., time resources (e.g., symbols, slots, subframes, frames, or the like) or frequency resources (e.g., subcarriers, carriers, or the like). Additionally, the wireless communications system may support wireless communications across various radio access technologies including third generation (3G) radio access technology, fourth generation (4G) radio access technology, fifth generation (5G) radio access technology, among other suitable radio access technologies beyond 5G (e.g., sixth generation (6G)).

SUMMARY

An article "a" before an element is unrestricted and understood to refer to "at least one" of those elements or "one or more" of those elements. The terms "a," "at least one," "one or more," and "at least one of one or more" may be interchangeable. As used herein, including in the claims, "or" as used in a list of items (e.g., a list of items prefaced by a phrase such as "at least one of" or "one or more of" or "one or both of") indicates an inclusive list such that, for example, a list of at least one of A, B, or C means A or B or C or AB or AC or BC or ABC (i.e., A and B and C). By way of another example, a list of at least one of A; B; or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on". Further, as used herein, including in the claims, a "set" may include one or more elements.

Some implementations of the method and apparatuses described herein may further include a UE for wireless communication. The UE receives a first signaling indicating a first value for a scheduling-related parameter for a learning model; determines a second value for the scheduling-related parameter; in response to a difference between the first value of the scheduling-related parameter and the second value of the scheduling-related parameter satisfying a threshold value, at least one of triggers a report associated with the first scheduling-related parameter, or transmits a second signaling indicating a result of a function of the first value of the scheduling-related parameter and the second value of the scheduling-related parameter.

In some implementations of the method and apparatuses described herein, the learning model comprises a learning-based scheduler, and wherein the scheduling-related parameter comprises at least one of a remaining latency budget, a UE buffer status, or a power headroom. Additionally or alternatively, the UE determines a reference time; and determines the second scheduling-related parameter value based at least in part on the first signaling and the reference time. Additionally or alternatively, the UE determines, based at least in part on the first signaling, whether to include the report in an uplink (UL) data transmission. Additionally or alternatively, the triggered report indicates a remaining latency budget associated with a traffic flow, and the at least one processor is further configured to cause the UE to include the report in the UL data transmission regardless of whether the UL data transmission can accommodate data units associated with all pending reports that include remaining latency budget associated with one or more traffic flows. Additionally or alternatively, the UE receives a second signaling that requests a delay status report; and transmits the delay status report regardless of whether data units associated with the delay status report have been discarded. Additionally or alternatively, the UE cancels the triggered report in response to all data units associated with the triggered report having been discarded, wherein the report is not triggered in response to receiving a second signaling from a network (such as a second signaling requesting a delay status report or sharing a delay status prediction or estimation from the network side with the UE). Additionally or alternatively, the report includes at least one of: a buffer size associated with a logical channel group, a remaining time associated with one or more packet data convergence protocol (PDCP) discardTimers among service data units (SDUs) buffered for the logical channel group, or a difference between a nominal UE maximum transmit power and an estimated power for a UL transmission in an activated serving cell. Additionally or alternatively, the UE receives a second signaling indicating the corresponding threshold for each of the multiple report types, wherein the second signaling comprises medium access control control element (MAC CE) or radio resource control (RRC) signaling, and wherein the multiple report types include a buffer status report, a delay status report, and a power headroom report. Additionally or alternatively, the function of the first value of the scheduling-related parameter and the second value of the scheduling-related parameter is an absolute value of a difference between the first value of the scheduling-related parameter and the second value of the scheduling-related parameter. Additionally or alternatively, the first signaling comprises a physical downlink control channel (PDCCH), wherein at least one of a logical channel group (LCG), a buffer size table, a delay size table, or a serving cell is indicated by a MAC CE or RRC signaling, and wherein the PDCCH includes a downlink control information (DCI) that includes at least one field that indicates at least one of: a buffer size that is associated with the LCG and the buffer size table; a remaining latency budget (RLB) associated with the LCG, the delay size table, and the buffer size table; or a power headroom that is associated with the serving cell and an UL transmission. Additionally or alternatively, the UE determines the UL transmission based at least in part on the first signaling.

Some implementations of the method and apparatuses described herein may further include a processor for wireless communication. The processor receives a first signaling indicating a first value for a scheduling-related parameter for a learning model; determines a second value for the scheduling-related parameter; in response to a difference between the first value of the scheduling-related parameter and the second value of the scheduling-related parameter satisfying a threshold value, at least one of triggers a report associated with the first scheduling-related parameter, or transmits a second signaling indicating a result of a function of the first value of the scheduling-related parameter and the second value of the scheduling-related parameter.

In some implementations of the method and apparatuses described herein, the learning model comprises a learning-based scheduler, and wherein the scheduling-related parameter comprises at least one of a remaining latency budget, a buffer status, or a power headroom. Additionally or alternatively, the processor determines a reference time; and determines the second scheduling-related parameter value based at least in part on the first signaling and the reference time. Additionally or alternatively, the processor receives a second signaling that requests a delay status report; and transmits the delay status report regardless of whether data units associated with the delay status report have been discarded. Additionally or alternatively, the report includes at least one of: a buffer size associated with a logical channel group, a remaining time associated with one or more PDCP discardTimers among SDUs buffered for the logical channel group, or a difference between a nominal UE maximum transmit power and an estimated power for an UL transmission in an activated serving cell.

Some implementations of the method and apparatuses described herein may further include a method performed by a UE, the method comprising: receiving a first signaling indicating a first value for a scheduling-related parameter for a learning model; determining a second value for the scheduling-related parameter; and in response to a difference between the first value of the scheduling-related parameter and the second value of the scheduling-related parameter satisfying a threshold value, at least one of triggering a report associated with the first scheduling-related parameter, or transmitting a second signaling indicating a result of a function of the first value of the scheduling-related parameter and the second value of the scheduling-related parameter.

Some implementations of the method and apparatuses described herein may further include a base station for wireless communication. The base station transmits a first signaling indicating a first value for a scheduling-related parameter for a learning model; receives a second signaling indicating a result of a function of the first value of the scheduling-related parameter and a second value of the scheduling-related parameter.

In some implementations of the method and apparatuses described herein, the function of the first value of the scheduling-related parameter and the second value of the scheduling-related parameter is an absolute value of a difference between the first value of the scheduling-related parameter and the second value of the scheduling-related parameter.

DETAILED DESCRIPTION

Figure 1:
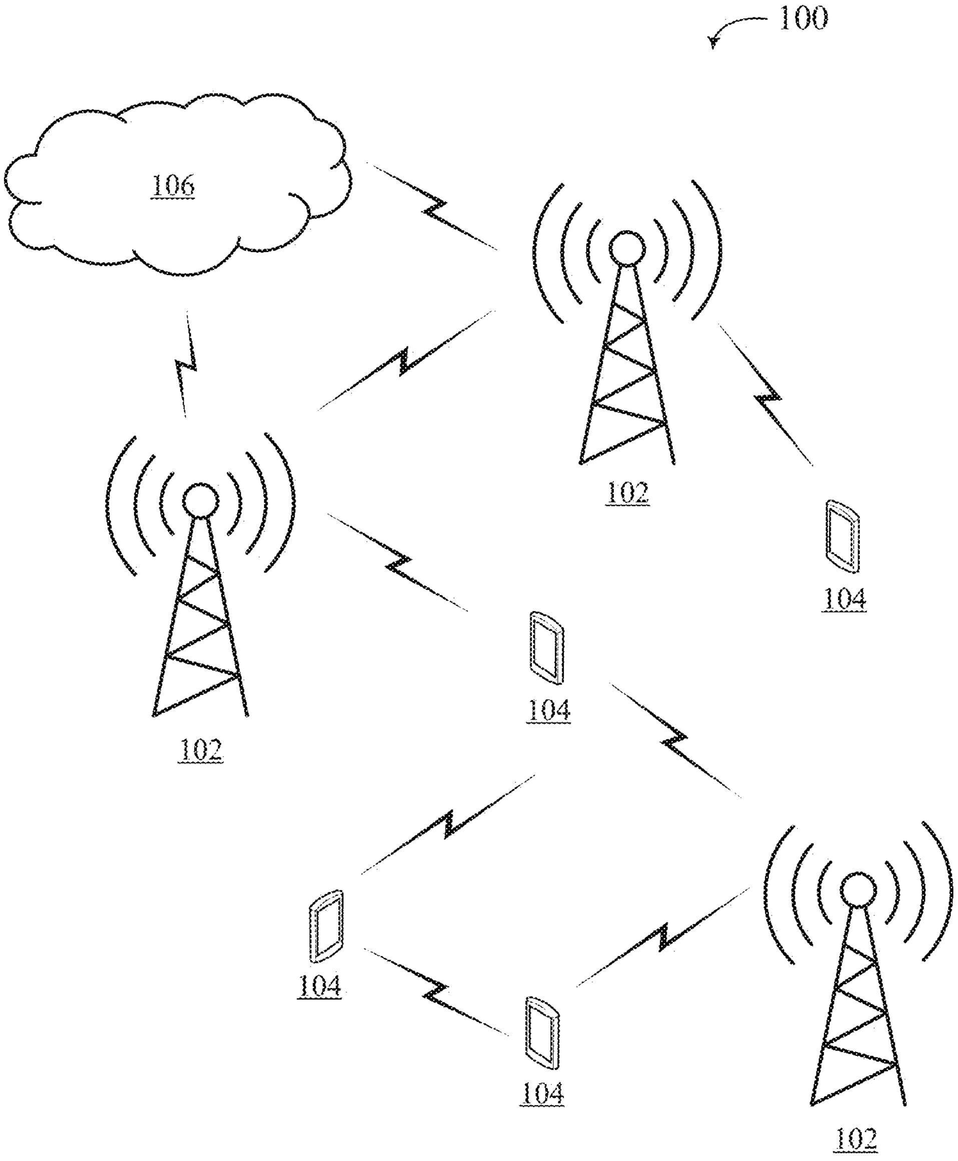
FIG. 1 illustrates an example of a wireless communications system in accordance with aspects of the present disclosure.

A scheduler schedules transmissions and/or receptions (e.g., of user data) per slot or a set of slots. Some schedulers can exploit a learning model, such as using artificial intelligence and machine learning (AI/ML) techniques, to determine time frequency resources, and/or to determine or predict other scheduling-related parameters associated with the scheduled transmissions and/or receptions (which could be useful for near-optimal scheduling according to any optimality criterion). The predicted scheduling-related parameters (e.g., remaining latency budget of a data unit or a power headroom) can be inaccurate due to prediction error, which can impact the performance of the scheduler.

Using the techniques discussed herein, scheduling-related parameters predicted by a network equipment (e.g., a base station) are shared with a UE, and the UE reports (e.g., to a network equipment, such as a base station) a correction to the predicted parameters if the prediction error satisfies a threshold. The prediction error is, for example, a difference (e.g., the absolute value of the difference) between a predicted scheduling-related parameter and the actual value of the scheduling-related parameter at the UE. The prediction error satisfies a threshold, for example, if the prediction error is greater than the threshold, or if the prediction error is greater than or equal to the threshold.

These corrections to the predicted scheduling-related parameters can help the learning model (e.g., a learning-based scheduler) better schedule users. The techniques discussed herein describe one or more reports, such as a buffer status report, delay status report or a power headroom report, triggered based on an indication from the scheduling side (e.g., the network equipment, such as a base station) compared with data calculated or measured at the UE. As such reports are time-dependent, techniques are also discussed herein for comparing the predicted and ground truth information (the data, report, or scheduling-related parameter calculated or measured at the UE) at a proper time.

Other solutions for obtaining scheduling-related parameters include monitoring the learning model performance at the scheduler side (e.g., at the network equipment, such as a base station), such as by the network configuring the UE for periodic reporting (such as for buffer status reporting (BSR), delay status reporting (DSR), and power headroom reporting (PHR)), or the network sending a request or indication to the UE to report scheduling-related parameter values (such as for BSR, DSR, and PHR). Compared to these other techniques, the techniques described herein avoid transmission of UE feedback or prediction-assistance information to the scheduler side when such information is not needed (e.g., when the scheduler predictions are good enough). This can reduce the number of transmissions made by the UE, which can be beneficial when UL resources are limited (such as in downlink (DL) heavy time division duplex (TDD) configurations or when the UE is transmission power limited).

Aspects of the present disclosure are described in the context of a wireless communications system.

FIG. 1 illustrates an example of a wireless communications system 100 in accordance with aspects of the present disclosure. The wireless communications system 100 may include one or more NE 102, one or more UE 104, and a core network (CN) 106. The wireless communications system 100 may support various radio access technologies. In some implementations, the wireless communications system 100 may be a 4G network, such as an LTE network or an LTE-Advanced (LTE-A) network. In some other implementations, the wireless communications system 100 may be a new radio (NR) network, such as a 5G network, a 5G-Advanced (5G-A) network, or a 5G ultrawideband (5G-UWB) network. In other implementations, the wireless communications system 100 may be a combination of a 4G network and a 5G network, or other suitable radio access technology including Institute of Electrical and Electronics Engineers (IEEE) 802.11 (Wi-Fi), IEEE 802.16 (WiMAX), IEEE 802.20. The wireless communications system 100 may support radio access technologies beyond 5G, for example, 6G. Additionally, the wireless communications system 100 may support technologies, such as time division multiple access (TDMA), frequency division multiple access (FDMA), or code division multiple access (CDMA), etc.

The one or more NE 102 may be dispersed throughout a geographic region to form the wireless communications system 100. One or more of the NE 102 described herein may be or include or may be referred to as a network node, a base station, a network element, a network function, a network entity, a radio access network (RAN), a NodeB, an eNodeB (eNB), a next-generation NodeB (gNB), or other suitable terminology. An NE 102 and a UE 104 may communicate via a communication link, which may be a wireless or wired connection. For example, an NE 102 and a UE 104 may perform wireless communication (e.g., receive signaling, transmit signaling) over a Uu interface.

An NE 102 may provide a geographic coverage area for which the NE 102 may support services for one or more UEs 104 within the geographic coverage area. For example, an NE 102 and a UE 104 may support wireless communication of signals related to services (e.g., voice, video, packet data, messaging, broadcast, etc.) according to one or multiple radio access technologies. In some implementations, an NE 102 may be moveable, for example, a satellite associated with a non-terrestrial network (NTN). In some implementations, different geographic coverage areas associated with the same or different radio access technologies may overlap, but the different geographic coverage areas may be associated with different NE 102.

The one or more UE 104 may be dispersed throughout a geographic region of the wireless communications system 100. A UE 104 may include or may be referred to as a remote unit, a mobile device, a wireless device, a remote device, a subscriber device, a transmitter device, a receiver device, or some other suitable terminology. In some implementations, the UE 104 may be referred to as a unit, a station, a terminal, or a client, among other examples. Additionally, or alternatively, the UE 104 may be referred to as an Internet-of-Things (IoT) device, an Internet-of-Everything (IoE) device, or machine-type communication (MTC) device, among other examples.

A UE 104 may be able to support wireless communication directly with other UEs 104 over a communication link. For example, a UE 104 may support wireless communication directly with another UE 104 over a device-to-device (D2D) communication link. In some implementations, such as vehicle-to-vehicle (V2V) deployments, vehicle-to-everything (V2X) deployments, or cellular-V2X deployments, the communication link may be referred to as a sidelink. For example, a UE 104 may support wireless communication directly with another UE 104 over a PC5 interface.

An NE 102 may support communications with the CN 106, or with another NE 102, or both. For example, an NE 102 may interface with other NE 102 or the CN 106 through one or more backhaul links (e.g., S1, N2, N6, or other network interface). In some implementations, the NE 102 may communicate with each other directly. In some other implementations, the NE 102 may communicate with each other indirectly (e.g., via the CN 106). In some implementations, one or more NE 102 may include subcomponents, such as an access network entity, which may be an example of an access node controller (ANC). An ANC may communicate with the one or more UEs 104 through one or more other access network transmission entities, which may be referred to as a radio heads, smart radio heads, or transmission-reception points (TRPs).

The CN 106 may support user authentication, access authorization, tracking, connectivity, and other access, routing, or mobility functions. The CN 106 may be an evolved packet core (EPC), or a 5G core (5GC), which may include a control plane entity that manages access and mobility (e.g., a mobility management entity (MME), an access and mobility management functions (AMF)) and a user plane entity that routes packets or interconnects to external networks (e.g., a serving gateway (S-GW), a packet data network (PDN) gateway (P-GW), or a user plane function (UPF)). In some implementations, the control plane entity may manage non-access stratum (NAS) functions, such as mobility, authentication, and bearer management (e.g., data bearers, signal bearers, etc.) for the one or more UEs 104 served by the one or more NE 102 associated with the CN 106.

The CN 106 may communicate with a packet data network over one or more backhaul links (e.g., via an S1, N2, N6, or other network interface). The packet data network may include an application server. In some implementations, one or more UEs 104 may communicate with the application server. A UE 104 may establish a session (e.g., a protocol data unit (PDU) session, or the like) with the CN 106 via an NE 102. The CN 106 may route traffic (e.g., control information, data, and the like) between the UE 104 and the application server using the established session (e.g., the established PDU session). The PDU session may be an example of a logical connection between the UE 104 and the CN 106 (e.g., one or more network functions of the CN 106).

In the wireless communications system 100, the NEs 102 and the UEs 104 may use resources of the wireless communications system 100 (e.g., time resources (e.g., symbols, slots, subframes, frames, or the like) or frequency resources (e.g., subcarriers, carriers)) to perform various operations (e.g., wireless communications). In some implementations, the NEs 102 and the UEs 104 may support different resource structures. For example, the NEs 102 and the UEs 104 may support different frame structures. In some implementations, such as in 4G, the NEs 102 and the UEs 104 may support a single frame structure. In some other implementations, such as in 5G and among other suitable radio access technologies, the NEs 102 and the UEs 104 may support various frame structures (i.e., multiple frame structures). The NEs 102 and the UEs 104 may support various frame structures based on one or more numerologies.

One or more numerologies may be supported in the wireless communications system 100, and a numerology may include a subcarrier spacing and a cyclic prefix. A first numerology (e.g., μ=0) may be associated with a first subcarrier spacing (e.g., 15 kHz) and a normal cyclic prefix. In some implementations, the first numerology (e.g., μ=0) associated with the first subcarrier spacing (e.g., 15 kHz) may utilize one slot per subframe. A second numerology (e.g., μ=1) may be associated with a second subcarrier spacing (e.g., 30 kHz) and a normal cyclic prefix. A third numerology (e.g., μ=2) may be associated with a third subcarrier spacing (e.g., 60 kHz) and a normal cyclic prefix or an extended cyclic prefix. A fourth numerology (e.g., μ=3) may be associated with a fourth subcarrier spacing (e.g., 120 kHz) and a normal cyclic prefix. A fifth numerology (e.g., μ=4) may be associated with a fifth subcarrier spacing (e.g., 240 kHz) and a normal cyclic prefix.

A time interval of a resource (e.g., a communication resource) may be organized according to frames (also referred to as radio frames). Each frame may have a duration, for example, a 10 millisecond (ms) duration. In some implementations, each frame may include multiple subframes. For example, each frame may include 10 subframes, and each subframe may have a duration, for example, a 1 ms duration. In some implementations, each frame may have the same duration. In some implementations, each subframe of a frame may have the same duration.

Additionally or alternatively, a time interval of a resource (e.g., a communication resource) may be organized according to slots. For example, a subframe may include a number (e.g., quantity) of slots. The number of slots in each subframe may also depend on the one or more numerologies supported in the wireless communications system 100. For instance, the first, second, third, fourth, and fifth numerologies (i.e., μ=0, μ=1, μ=2, μ=3, μ=4) associated with respective subcarrier spacings of 15 kHz, 30 kHz, 60 kHz, 120 kHz, and 240 kHz may utilize a single slot per subframe, two slots per subframe, four slots per subframe, eight slots per subframe, and 16 slots per subframe, respectively. Each slot may include a number (e.g., quantity) of symbols (e.g., OFDM symbols). In some implementations, the number (e.g., quantity) of slots for a subframe may depend on a numerology. For a normal cyclic prefix, a slot may include 14 symbols. For an extended cyclic prefix (e.g., applicable for 60 kHz subcarrier spacing), a slot may include 12 symbols. The relationship between the number of symbols per slot, the number of slots per subframe, and the number of slots per frame for a normal cyclic prefix and an extended cyclic prefix may depend on a numerology. It should be understood that reference to a first numerology (e.g., μ=0) associated with a first subcarrier spacing (e.g., 15 kHz) may be used interchangeably between subframes and slots.

In the wireless communications system 100, an electromagnetic (EM) spectrum may be split, based on frequency or wavelength, into various classes, frequency bands, frequency channels, etc. By way of example, the wireless communications system 100 may support one or multiple operating frequency bands, such as frequency range designations FR1 (410 MHz-7.125 GHz), FR2 (24.25 GHz-52.6 GHz), FR3 (7.125 GHz-24.25 GHz), FR4 (52.6 GHz-114.25 GHz), FR4a or FR4-1 (52.6 GHz-71 GHz), and FR5 (114.25 GHz-300 GHz). In some implementations, the NEs 102 and the UEs 104 may perform wireless communications over one or more of the operating frequency bands. In some implementations, FR1 may be used by the NEs 102 and the UEs 104, among other equipment or devices for cellular communications traffic (e.g., control information, data). In some implementations, FR2 may be used by the NEs 102 and the UEs 104, among other equipment or devices for short-range, high data rate capabilities.

FR1 may be associated with one or multiple numerologies (e.g., at least three numerologies). For example, FR1 may be associated with a first numerology (e.g., μ=0), which includes 15 kHz subcarrier spacing; a second numerology (e.g., μ=1), which includes 30 kHz subcarrier spacing; and a third numerology (e.g., μ=2), which includes 60 kHz subcarrier spacing. FR2 may be associated with one or multiple numerologies (e.g., at least 2 numerologies). For example, FR2 may be associated with a third numerology (e.g., μ=2), which includes 60 kHz subcarrier spacing; and a fourth numerology (e.g., μ=3), which includes 120 kHz subcarrier spacing.

In some cases, a cell refers to a radio access node in communication with a base station or including a base station. A cell typically has a coverage area, which is a geographic area in which the cell provides wireless connectivity to devices within. Different cells may operate on defined frequencies or frequency bands, referred to as subcarriers. In some examples, a UE 104 establishes a wireless connection with a cell, and subsequently that cell may be referred to as a serving cell of the UE 104.

Reference is made herein to receiving or transmitting data, information, messages, and so forth. It is to be appreciated that other terms may be used interchangeably with receiving or transmitting, such as communicating, outputting, forwarding, retrieving, obtaining, and so forth.

Figure 2:
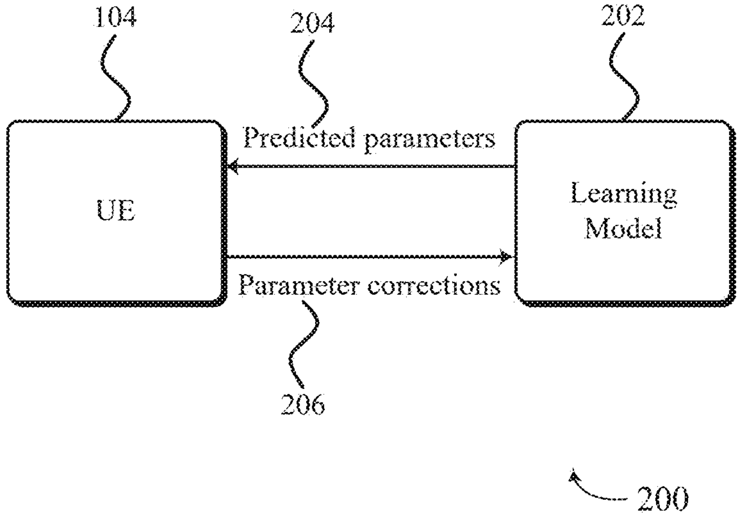
FIG. 2 illustrates an example of a system including a learning model in accordance with aspects of the present disclosure.

FIG. 2 illustrates an example of a system 200 including a learning model in accordance with aspects of the present disclosure. The system 200 may be implemented as part of the wireless communications system 100 of FIG. 1. The system 200 includes a learning model 202 (e.g., a learning-based scheduler), which may be implemented in a NE 102 (e.g., a base station) or the CN 106. The learning model 202 can schedule user data communications (e.g., transmissions and/or receptions) with a UE 104 per slot or per set of slots. The learning model 202 can be, for example, a machine learning or artificial intelligence model, and can determine time frequency resources, and/or determine or predict other scheduling-related parameters associated with the scheduled transmissions and/or receptions. The parameters 204 predicted by the learning model 202 are communicated to the UE 104, and the UE 104 communicates to the learning model 202 a correction 206 to the predicted parameters if the prediction error satisfies (e.g., is greater than, or is greater than or equal to) a threshold.

Discussions are made herein to a scenario in which the learning model or inference is at the network side, and the model performance monitoring is performed at the UE side. However, it is to be appreciated that the techniques discussed herein apply analogous to scenarios in which the learning model or inference is at the UE side, and the model performance monitoring is performed at the network side.

Referring back to FIG. 1, instead of monitoring the performance of the learning model at the UE 104 side, the network can perform such monitoring itself based on feedback or assistance information received from the UE 104. For example, the network (e.g., a NE 102) may configure a buffer status reporting periodicity, and the UE 104 can report such information periodically, and the NE 102 or network can compare its predicted buffer size with the ground truth buffer size reported by the UE 104. By way of another example, the network (e.g., a NE 102) can send an indication to the UE 104, triggering a buffer status report. While theses schemes are feasible techniques, they may lead to more-than-needed UL reports which could be a problem when UL resources are limited (such as in DL heavy TDD configurations or when UE is transmission power limited).

The BSR procedure is used to provide the serving base station (e.g., gNB) with information about UL data volume in the MAC entity. Each logical channel may be allocated to an LCG using the logicalChannelGroup. The MAC entity determines the amount of UL data available for a logical channel according to the data volume calculation procedure in 3rd Generation Partnership Project (3GPP) technical specification (TS) 38.322 and 3GPP TS 38.323.

A BSR shall be triggered if any of the following events occur for activated cell group: UL data, for a logical channel which belongs to an LCG, becomes available to the MAC entity; and either this UL data belongs to a logical channel with higher priority than the priority of any logical channel containing available UL data which belong to any LCG, or none of the logical channels which belong to an LCG contains any available UL data. In such situations the BSR is referred below to as 'Regular BSR'.

If UL resources are allocated and number of padding bits is equal to or larger than the size of the Buffer Status Report MAC CE plus its subheader, the BSR is referred below to as 'Padding BSR'. If retxBSR-Timer expires and at least one of the logical channels which belong to an LCG contains UL data, the BSR is referred below to as 'Regular BSR'. If periodicBSR-Timer expires, the BSR is referred below to as 'Periodic BSR'.

It should be noted that when Regular BSR triggering events occur for multiple logical channels simultaneously, each logical channel triggers one separate Regular BSR.

For Regular and Periodic BSR, the MAC entity for which logicalChannelGroupLAB-Ext is not configured by upper layers shall: 1) if for at least one LCG configured with additionalBSR-TableAllowed, the amount of UL data available for transmission is within the buffer sizes specified in Table 6.1.3.1-3, Refined Long BSR is reported for all LCGs which have data available for transmission; 2) otherwise, if more than one LCG has data available for transmission when the MAC PDU containing the BSR is to be built: Long BSR is reported for all LCGs which have data available for transmission, otherwise Short BSR is reported.

The DSR procedure is used to provide the serving base station (e.g., gNB) with delay status of LCGs. This delay status for an LCG includes remaining time, which is the smallest remaining value of the PDCP discardTimers among SDUs buffered for the LCG as specified in clause 7.3 in 3GPP TS 38.323, and the total amount of delay-critical UL data for the LCG according to the data volume calculation procedure specified in clause 5.5 in 3GPP TS 38.322 and clause 5.6 in 3GPP TS 38.323 for the associated RLC and PDCP entities, respectively.

RRC controls the DSR procedure by configuring the following parameter: remainingTimeThreshold, which is the threshold on remaining time for triggering a DSR for an LCG.

If an LCG is configured for delay status reporting, if the smallest remaining value of the PDCP discardTimers among all the data buffered for the LCG that has not been transmitted in any MAC PDU or reported as data volume in a DSR MAC CE becomes below remainingTimeThreshold of the LCG, and if there is no DSR pending for the LCG since the last transmission of a DSR MAC CE, the MAC entity triggers a DSR for the LCG.

If there is at least one DSR pending, if UL shared channel (UL-SCH) resources are available for a new transmission and the UL-SCH resources can accommodate the DSR MAC CE plus its subheader as a result of logical channel prioritization, the MAC entity instructs the Multiplexing and Assembly procedure to generate the DSR MAC CE. Otherwise, if there is no pending SR already triggered by the DSR procedure for the same logical channel as this DSR 2, the MAC entity triggers a Scheduling Request.

An SDU is considered to be associated with a DSR if it is associated with the LCG which triggered the DSR and the remaining value of its PDCP discardTimer is below remainingTimeThreshold.

MAC PDU shall contain at most one DSR MAC CE. The MAC entity shall not include a DSR MAC CE in a MAC PDU if the MAC PDU can accommodate the SDUs associated with all the pending DSRs. After a DSR is triggered, it is considered as pending until it is cancelled. The MAC entity shall cancel a pending DSR, either when all the SDUs associated with the DSR have been discarded, or when a MAC PDU is transmitted and this MAC PDU includes either all the SDUs associated with the DSR or a DSR MAC CE that contains the delay information of all the SDUs associated with the DSR (as described in the clause 6.1.3.72).

The power headroom reporting procedure is used to provide the serving base station (e.g., gNB) with the following information: Type 1 power headroom, which is the difference between the nominal UE maximum transmit power and the estimated power for UL-SCH transmission per activated Serving Cell.

A PHR is triggered if any of the following events occur:

phr-ProhibitTimer expires or has expired and the path loss has changed more than phr-Tx-PowerFactorChange dB for at least one reference signal (RS) used as pathloss reference for one activated Serving Cell of any MAC entity of which the active DL bandwidth part (BWP) is not dormant BWP since the last transmission of a PHR in this MAC entity when the MAC entity has UL resources for new transmission. It should be noted that the path loss variation for one cell assessed above is between the pathloss measured at present time on the current pathloss reference and the pathloss measured at the transmission time of the last transmission of PHR on the pathloss reference in use at that time, irrespective of whether the pathloss reference has changed in between. The current pathloss reference for this purpose does not include any pathloss reference configured using pathlossReferenceRS-Pos in 3GPP TS 38.331;

phr-PeriodicTimer expires;

upon configuration or reconfiguration of the power headroom reporting functionality by upper layers, which is not used to disable the function;

activation of an SCell of any MAC entity with configured uplink of which firstActiveDownlinkBWP-Id is not set to dormant BWP;

activation of a secondary cell group (SCG);

addition of the PSCell except if the SCG is deactivated (e.g., PSCell is newly added or changed);

phr-ProhibitTimer expires or has expired, when the MAC entity has UL resources for new transmission, and the following is true for any of the activated Serving Cells of any MAC entity with configured uplink: there are UL resources allocated for transmission or there is a physical uplink control channel (PUCCH) transmission on this cell, and the required power backoff due to power management (as allowed by P-MPRc as specified in 3GPP TS 38.101-1, 3GPP TS 38.101-2, and 3GPP TS 38.101-3) for this cell has changed more than phr-Tx-PowerFactorChange dB since the last transmission of a PHR when the MAC entity had UL resources allocated for transmission or PUCCH transmission on this cell.

Upon switching of activated BWP from dormant BWP to non-dormant DL BWP of an SCell of any MAC entity with configured uplink. It should be noted that the MAC entity is expected to avoid triggering a PHR when the required power backoff due to power management decreases only temporarily (e.g., for up to a few tens of milliseconds) and to avoid reflecting such temporary decrease in the values of PCMAX,f,c/power headroom (PH) (when a PHR is triggered by other triggering conditions.

If the MAC entity has UL resources allocated for a new transmission, if it is the first UL resource allocated for a new transmission since the last MAC reset, the MAC entity starts phr-PeriodicTimer.

If the Power Headroom reporting procedure determines that at least one PHR has been triggered and not cancelled, and if the allocated UL resources can accommodate the MAC CE for PHR which the MAC entity is configured to transmit, plus its subheader, as a result of logical channel prioritization (LCP) as defined in clause 5.4.3.1, if multiplePHR with value true is configured: for each activated Serving Cell with configured uplink associated with any MAC entity of which the active DL BWP is not dormant BWP, and for each activated Serving Cell with configured uplink associated with evolved universal terrestrial radio access (E-UTRA) MAC entity, if this MAC entity is not configured with twoPHRMode, and if this serving cell is not configured with multiple TRP physical uplink shared channel (PUSCH) repetition or the MAC entity this serving cell belongs to is not configured with twoPHRMode, the MAC entity obtains the value of the Type 1 or Type 3 power headroom for the corresponding uplink carrier as specified in clause 7.7 of 3GPP TS 38.213 for NR Serving Cell and clause 5.1.1.2 of 3GPP TS 36.213 for E-UTRA Serving.

The discussions herein refer to a delay status (DS) that can include a, and a buffer size associated with the RLB. The discussion herein also refer to a scenario in which the learning model or inference is at the network (e.g., an NE 102) side, and the model performance monitoring is performed at the UE 104 side. In one or more implementations, the UE 104 receives a first indication (e.g., a first signaling) from a network indicating a first scheduling-related parameter value and determines if the first scheduling-related parameter value is different than a second scheduling-related parameter value (which is determined by the UE 104) by more than (or optionally equal to) a threshold amount. In response to such a determination, the UE 104 triggers a report associated with the first scheduling-related parameter value and/or indicates via a second indication (e.g., a second signaling) a function of the first scheduling-related parameter value and the second scheduling-related parameter value to the network (e.g., an NE 102).

While the discussions herein focus on the scheduler containing a learning model (e.g., an AI/ML model), the techniques discussed herein can be analogously applied to any network learning (e.g., AI/ML) model functionality.

Figure 3:
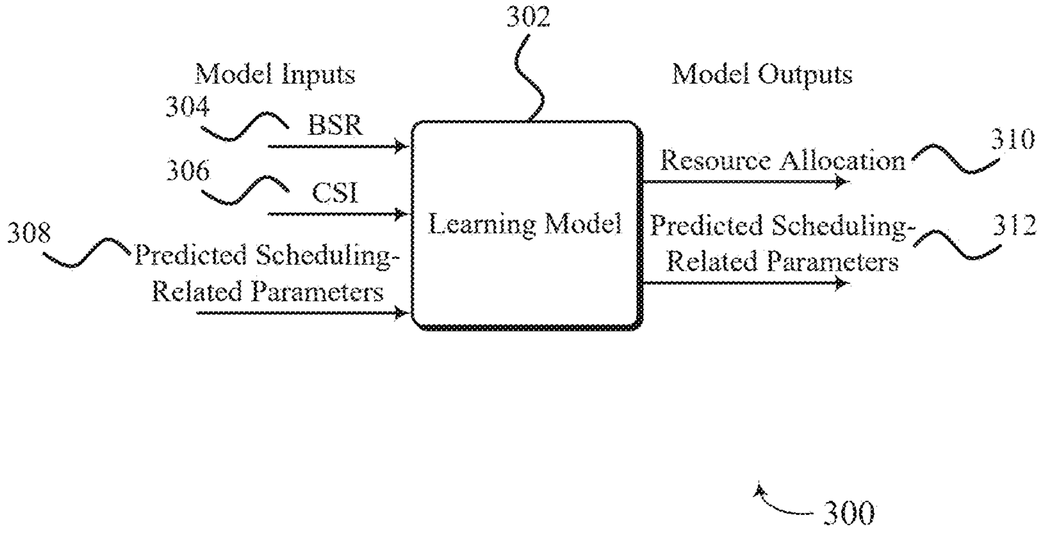
FIG. 3 illustrates an example of a learning model in accordance with aspects of the present disclosure.

FIG. 3 illustrates an example 300 of a learning model in accordance with aspects of the present disclosure. The example 300 includes a learning model 302 that is, for example, a prediction-based scheduler. The learning model 302 receives various inputs, such as a BSR 304 received from a UE, channel state information (CSI) 306 received from a UE, one or more predicted scheduling-related parameters 308, and so forth. The one or more scheduling-related parameters 308 can be parameters predicted by the learning model 302 and/or parameters that have been corrected by the UE. The one or more predicted scheduling-related parameters 308 can include, for example, a remaining latency budget of the UE, a UE buffer status, a power headroom of the UE, and so forth.

The learning model 302 generates various outputs, such as resource allocation 310 (e.g., resources that can be allocated to UEs for communication (e.g., transmission and/or reception), and predicted scheduling-related parameters 312. The predicted scheduling-related parameters 312 can also be inputs to the learning model 302 (as predicted scheduling-related parameters 308) at a later time for generation of model outputs at a later time.

Figure 4:
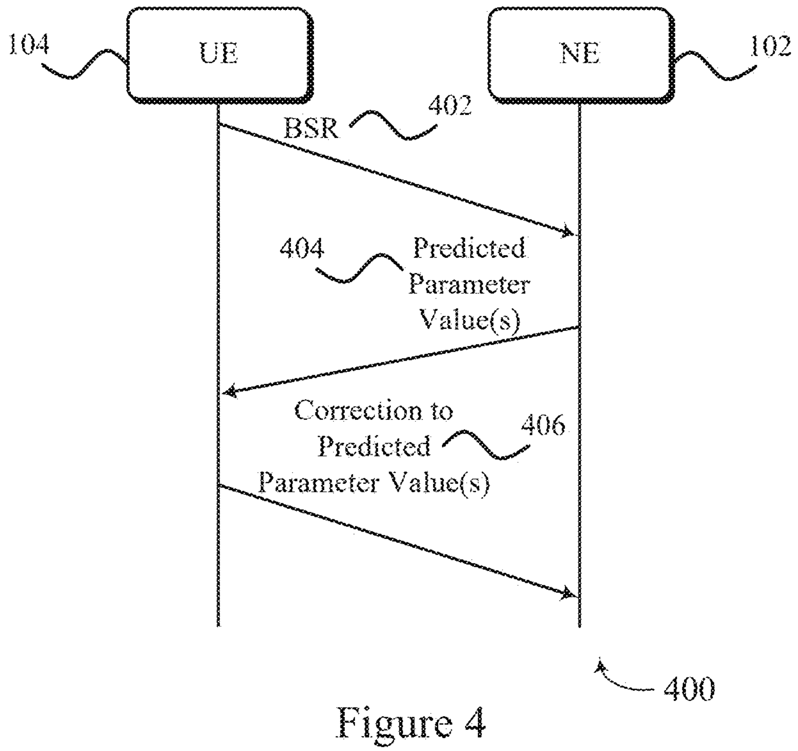
FIG. 4 illustrates an example of a timeline of a parameter correction for a learning model in accordance with aspects of the present disclosure.

FIG. 4 illustrates an example of a timeline 400 of a parameter correction for a learning model in accordance with aspects of the present disclosure. The timeline 400 is, for example, a timeline of a scheduling-related parameter correction for a prediction-based scheduler.

The UE 104 communicates (e.g., sends, transmits, outputs) a BSR 402 to the NE 102, and the scheduler (e.g., based on AI/ML techniques) considering the BSR 402 as an input to the scheduler, schedules the UE 104. The NE 102 also communicates (e.g., sends, transmits, outputs) to the UE 104 one or more parameter values 404 predicted by the scheduler, such as RLB and data volume pending in the UE's buffer (buffer status) or power headroom (PH). The RLB is associated with a logical channel group (LCG). The determination of when to communicate the one or more predicted parameter values 404 to the UE 104 (e.g., share the predicted parameters with the UE 104) can be based on network implementation, so whenever the network (e.g., the NE 102) chooses it shares its prediction, such as when a confidence measure in at least one of the predicted parameter values is smaller than a threshold amount.

The UE 104 communicates (e.g., sends, transmits, outputs) to NE 102 a correction 406 to the one or more predicted parameter values if at least one of the one or more predicted parameter values 404 differs from the actual parameter value by a threshold amount. For example, the UE 104 may communicate the correction 406 to the NE 102 if the difference between the actual parameter value and the predicted parameter value is greater than (or optionally greater than or equal to) the threshold amount. The correction can be a function of the predicted parameter value (also referred to below as the first value for the scheduling-related parameter) and the actual parameter value (also referred to below as the second value for the scheduling-related parameter), such as an absolute value of the difference between the predicted parameter value and the actual parameter value.

Figure 5:
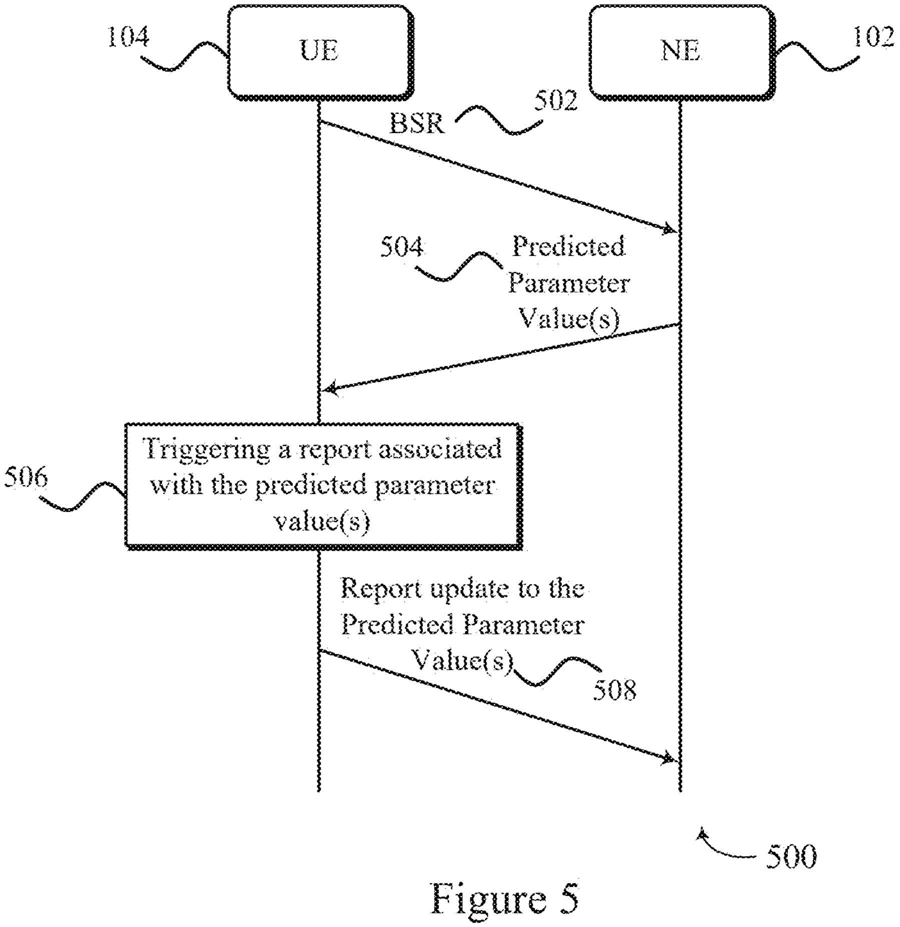
FIG. 5 illustrates an example of a timeline of reporting a parameter correction for a learning model in accordance with aspects of the present disclosure.

FIG. 5 illustrates an example of a timeline 500 of reporting a parameter correction for a learning model in accordance with aspects of the present disclosure. The timeline 500 is, for example, a timeline of reporting a scheduling-related parameter for a prediction-based scheduler.

The UE 104 communicates (e.g., sends, transmits, outputs) a BSR 502 to the NE 102, and the scheduler (e.g., based on AI/ML techniques) considering the BSR 502 as an input to the scheduler, schedules the UE 104. The NE 102 also communicates (e.g., sends, transmits, outputs) to the UE 104 one or more parameter values 504 predicted by the scheduler, such as RLB and data volume pending in the UE's buffer (buffer status) or power headroom (PH). The RLB is associated with a logical channel group (LCG). The determination of when to communicate the one or more predicted parameter values 504 to the UE 104 (e.g., share the predicted parameters with the UE 104) can be based on network implementation, so whenever the network (e.g., the NE 102) chooses it shares its prediction, such as when a confidence measure in at least one of the predicted parameter values is smaller than a threshold amount.

The UE 104 triggers 506 a report associated with one or more predicted parameter values 504 if at least one of the one or more predicted parameter values 504 differs from the actual parameter value by a threshold amount. For example, the UE 104 may trigger the report if the difference between the actual parameter value (also referred to below as the second value for the scheduling-related parameter) and the predicted parameter value (also referred to below as the first value for the scheduling-related parameter) is greater than (or optionally greater than or equal to) the threshold amount. The UE 104 communicates (e.g., sends, transmits, outputs) the triggered report 508 to the NE 102.

Returning to FIG. 1, the first indication or first signaling (e.g., communicating the one or more predicted parameter values 404 of FIG. 4 or the one or more predicted parameter values 504 of FIG. 5) can be, for example, a DCI, a MAC CE, or an RRC message.

The second indication or second signaling (e.g., communicating the correction 406 of FIG. 4 or the report 508 of FIG. 5) can be, for example, an RRC message, a MAC CE, or an uplink control information (UCI).

The first indication or first signaling (e.g., communicating the one or more predicted parameter values 404 of FIG. 4 or the one or more predicted parameter values 504 of FIG. 5) can trigger one or more of a BSR, a DSR, or a PHR. The first indication can indicate at least one of a buffer status (BS) value (or a set of BS values), a LCG index (or a set of LCG indices), or a BSR format; and the UE, based on the first indication, triggers the associated BSR if the difference between the BS value is different than that determined by the UE. The first indication can indicate at least one of a DS value (or a set of DS values), a LCG index (or a set of LCG indices), or a DSR format; and the UE, based on the first indication, triggers the associated DSR if the difference between the DS value is different than that determined by the UE. A DS value can include a RLB value and a buffer size. The first indication can indicate at least one of a PH value (or a set of PH values), a serving cell index (or a set of serving cell indices), whether the associated PH is based on a real transmission or a reference format, power class, or maximum transmission power (e.g., PCMAX,f,c).

The first indication or first signaling (e.g., communicating the one or more predicted parameter values 404 of FIG. 4 or the one or more predicted parameter values 504 of FIG. 5) can be a DCI indication or signaling. In one or more implementations, a DCI field indicates a first buffer size, and the UE determines which LCG corresponds to the first buffer size, based on a previously received and acknowledged MAC CE. Additionally or alternatively, a DCI field indicates a first PH value and/or a PCMAX,f,c, and the UE determines which serving cell corresponds to the first PH value and/or the PCMAX,f,c based on a previously received and acknowledged MAC CE. Additionally or alternatively, a first DCI field indicates a type for the first scheduling-related parameter (e.g., BS, RLB, PH), and a second DCI field indicates the corresponding value of the first scheduling-related parameter.

The first indication or first signaling (e.g., communicating the one or more predicted parameter values 404 of FIG. 4 or the one or more predicted parameter values 504 of FIG. 5) can be a MAC CE indication. The MAC CE can identified by a MAC subheader with a logical channel identifier (LCID). The MAC CE can have a variable size, and includes a bitmap, and for any serving cell determined based on the bitmap, a PH type field and a field (e.g., an octet in size) containing the associated PCMAX,f,c field (if to be checked with the UE). The bitmap indicates for which serving cells, the first scheduling-related parameter corresponds to.

If the UE determines that the first scheduling-related parameter (e.g., the predicted parameter value) is not different than a second scheduling-related parameter (e.g., the actual parameter value) by more than a threshold, the UE at least one of does not trigger the associated report, or the UE indicates to the network that the difference is negligible, or the UE does not communicate (e.g., sends, transmits, outputs) the second scheduling-related parameter. A UCI codepoint (possible value) can indicate that the difference is negligible. A set of contention-based resources can be shared amongst UEs, and if any UE has the difference between its first scheduling-related parameter and second scheduling-related parameter larger than the threshold, the UE can transmit the difference in the contention-based resources.

The DCI can include at least one field that indicates a predicted RLB associated with a LCG for the UE. The LCG is determined to be the LCG whose LCG index is determined based on at least one of the DCI (e.g., another field in the DCI), the LCG with shortest previously reported remaining latency budget, the LCG with a smallest latency budget or packet data unit set delay budget (PSDB) (each packet or PDU set of the associated flow has a latency budget when the packet or PDU set is generated), or the LCG that is configured for DCI indication of the RLB. The LCG index can be configured in at least one of the MAC-CellGroupConfig information element or PDCCH or search space set configuration.

The DCI can have a group-common DCI format, and includes a first field for a first UE and a second field for a second UE. The first field and the second field indicate RLBs for the first UE and second UE, respectively. The first UE is configured with a first field location (e.g., first index to a block number or first starting bit location of a first block of a plurality of blocks, where the first block comprises information bits at least a portion of which is indicating a first RLB for the first UE) in the DCI and the second UE is configured with a second field location (e.g., second index to a block number or second starting bit location of a second block of the plurality of blocks, where the second block comprises information bits at least a portion of which is indicating a second RLB for the second UE) in the DCI. A third field can be configured in the DCI, which can indicate an LCG index associated with the first RLB for the first UE (e.g., the first block information bits further comprising an indication of the LCG index associated with the first RLB for the first UE), and a fourth field can be configured in the DCI, which can indicate an LCG index associated with the second RLB for the second UE (e.g., the second block information bits further comprising an indication of the LCG index associated with the second RLB for the second UE). The UE, upon decoding of the DCI, triggers a DSR unless a DSR is already pending.

The DCI can have a scheduling DCI format and the resources assigned for UL communication in the DCI can be used to transmit the second RLB and some part of the associated data.

The first scheduling-related parameter can be predicted by the network (e.g., an NE 102), and the second scheduling-related parameter can be determined by the UE.

The threshold can be configured or communicated (e.g., sent, transmitted, output) by the NE (e.g., an NE 102) using MAC CE.

The function of the first scheduling-related parameter (e.g., the predicted parameter value) and second scheduling-related parameter (e.g., the actual parameter value) to the network can be the absolute difference between the first scheduling-related parameter and second scheduling-related parameter, or the one-way difference (e.g., second scheduling-related parameter value minus first scheduling-related parameter value).

The DCI may not indicate any particular value for the first scheduling-related parameter (e.g., the predicted parameter value) and may just indicate whether the scheduling-related parameter is less than a configured or MAC CE indicated threshold 'T'. For example, the UE receives the DCI and a field in the DCI indicates '1' which means the understanding of the network (e.g., an NE 102) is that the scheduling-related parameter is less than 'T'.

The difference between the first scheduling-related parameter (e.g., the predicted parameter value) and the second scheduling-related parameter (e.g., the actual parameter value) can be calculated based on the time the UE has received the first scheduling-related parameter. For example, when the scheduling-related parameter is RLB, the UE calculates the second RLB value based on the time the first indication or first signaling (e.g., communicating the one or more predicted parameter values 404 of FIG. 4 or the one or more predicted parameter values 504 of FIG. 5) is received, and then calculates the difference (second RLB value minus first RLB value).

Additionally or alternatively, the difference between the first scheduling-related parameter (e.g., the predicted parameter value) and the second scheduling-related parameter (e.g., the actual parameter value) can be calculated based on the time the UE transmits in response to the reception of the first indication or first signaling (e.g., communicating the one or more predicted parameter values 404 of FIG. 4 or the one or more predicted parameter values 504 of FIG. 5). When the scheduling-related parameter is RLB, the UE calculates the second RLB based on the time the UE is supposed to send the second indication or second signaling (e.g., communicating the correction 406 of FIG. 4 or the report 508 of FIG. 5), and then calculates the difference (second RLB value minus first RLB value).

Additionally or alternatively, the difference between the first scheduling-related parameter (e.g., the predicted parameter value) and the second scheduling-related parameter (e.g., the actual parameter value) can be calculated based on a reference time. The UE determines the second scheduling-related parameter at a reference time or within a reference time window, and then calculates the difference (second scheduling-related parameter value minus first scheduling-related parameter value). The reference time can be determined based on a configured offset from the time the first indication or first signaling (e.g., communicating the one or more predicted parameter values 404 of FIG. 4 or the one or more predicted parameter values 504 of FIG. 5) is received (e.g., after the end of the physical downlink channel (e.g., downlink control channel or downlink shared channel) carrying the first indication or first signaling) or based on the time a positive acknowledgment in response to the first indication or first signaling is sent (e.g., after the end of the physical uplink channel (e.g., uplink control channel or uplink shared channel) carrying the positive acknowledgment). The reference time window can be determined based on at least one of a time indication by the network and a configured time window length, or an indication of a time window length (e.g., in the first indication or first signaling) and a determined reference time (such as the time the first indication is received or the time the UE is supposed to send the second indication or second signaling (e.g., communicating the correction 406 of FIG. 4 or the report 508 of FIG. 5)).

Additionally or alternatively, the network (e.g., an NE 102) can predict the time the difference should be computed at and provide the first scheduling-related parameter value accordingly so that the UE does not need to make adjustment due to time difference between the first scheduling-related parameter value and the second scheduling-related parameter value.

The difference between the first scheduling-related parameter (e.g., the predicted parameter value) and the second scheduling-related parameter (e.g., the actual parameter value) can be determined in a non-linear domain, such as logarithmic domain (e.g., log (first scheduling-related parameter value) minus log (second scheduling-related parameter value)).

Figure 6:
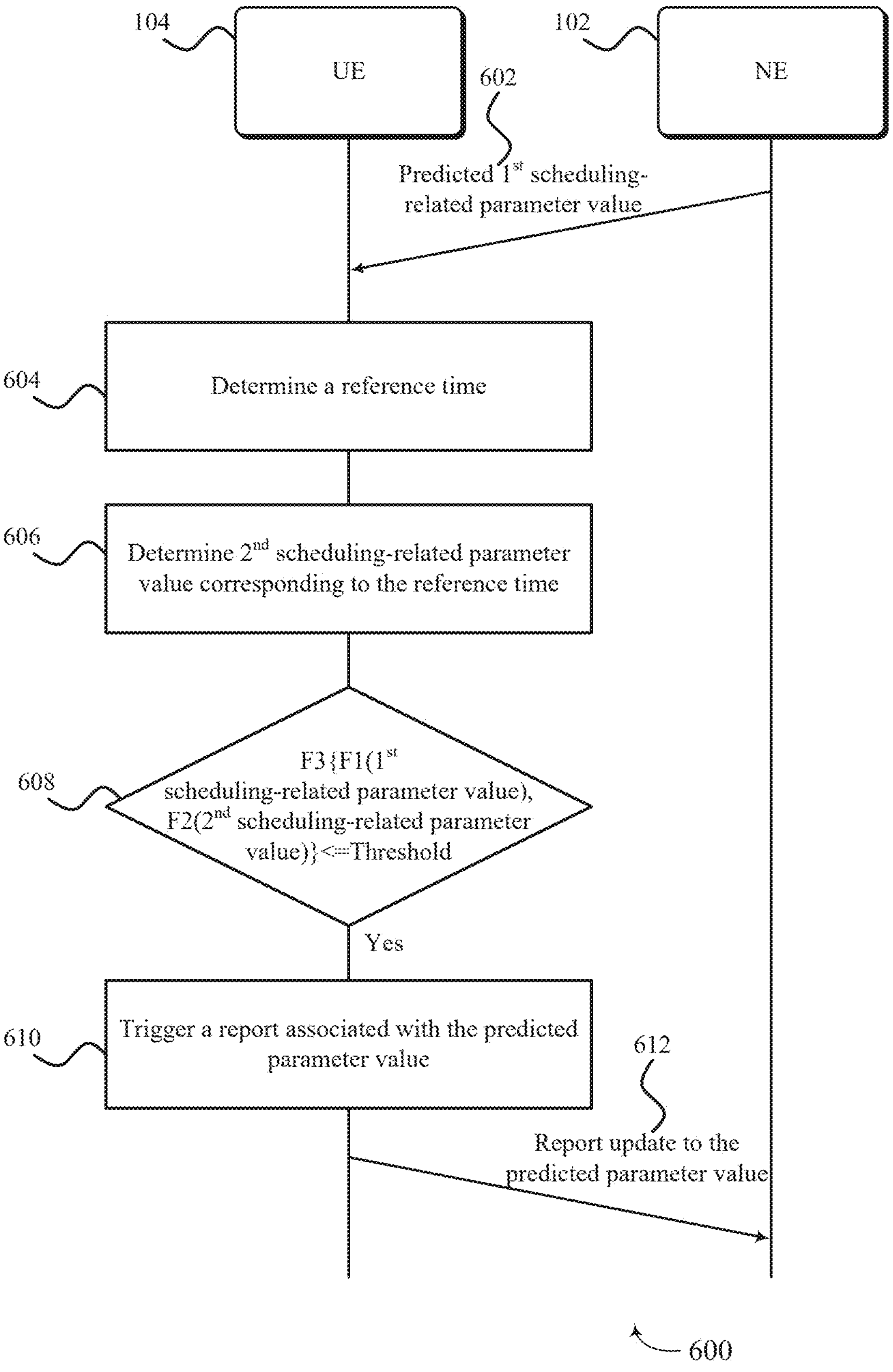
FIGS. 6 and 7 illustrate examples of learning model monitoring at the UE side in accordance with aspects of the present disclosure.

FIG. 6 illustrates an example 600 of learning model monitoring at the UE side in accordance with aspects of the present disclosure. The scheduling-related parameter can be, for example, one or more of a remaining latency budget, a data volume in the UE's buffer (buffer status), or a power headroom. At 602, the UE 104 communicates (e.g., sends, transmits, outputs) to the UE 104 a first ($1^{st}$) scheduling-related parameter value predicted by the scheduler. The determination of when to communicate the predicted scheduling-related parameter value to the UE 104 (e.g., share the predicted parameters with the UE 104) can be based on network implementation, so whenever the network (e.g., the NE 102) chooses it shares its prediction, such as when a confidence measure in the predicted scheduling-related parameter value is smaller than a threshold amount.

At 604, the UE 104 determines a reference time. The reference time can be determined in various manners as discussed above, such as based on a configured offset from the time the first scheduling-related parameter value predicted by the scheduler is received at the UE 104 or based on the time a positive acknowledgment in response to receipt of the first scheduling-related parameter value predicted by the scheduler is sent by the UE 104.

At 606, the UE 104 determines a second scheduling-related parameter value corresponding to the reference time. The second scheduling-related parameter value may be, for example, the actual value of the scheduling-related parameter at the UE 104 at or based on the reference time.

At 608, the UE 104 determines whether a function F3 is less than or equal to (or just less than) a threshold value. The function F3 is based on a function F1 of the $1^{st}$ scheduling-related parameter value and function F2 of the $2^{nd}$ scheduling-related parameter value. The function F3 can be, for example, a function that determines the absolute value of the difference between the $1^{st}$ scheduling-related parameter value and the $2^{nd}$ scheduling-related parameter value.

At 610, the UE 104 triggers a report associated with the predicted scheduling-related parameter value if the function F3 is less than or equal to (or just less than) a threshold value. If the function F3 is not less than or equal to (or just less than) the threshold value, no such report is triggered.

At 612, the UE 104 communicates (e.g., sends, transmits, outputs) the triggered report to the NE 102.

The example 600 is discussed with reference to a first scheduling-related parameter value. It should be noted that the example 600 can be repeated for scheduling-related parameter values for multiple different scheduling-related parameters, or that the example 600 can be performed for scheduling-related parameter values for multiple different scheduling-related parameters concurrently.

Figure 7:
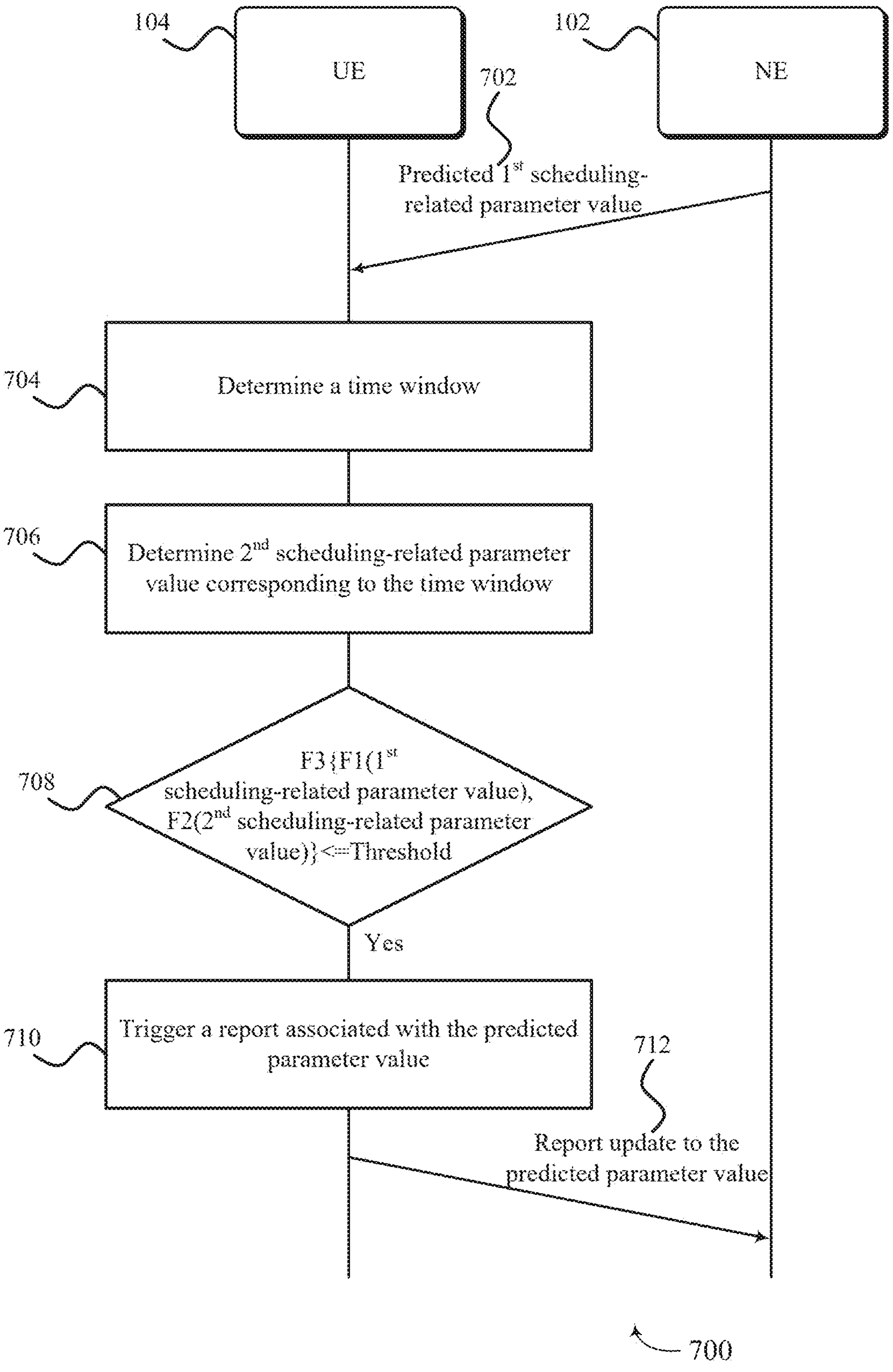

FIG. 7 illustrates an example 700 of learning model monitoring at the UE side in accordance with aspects of the present disclosure. The scheduling-related parameter can be, for example, one or more of a remaining latency budget, a data volume in the UE's buffer (buffer status), or a power headroom. At 702, the UE 104 communicates (e.g., sends, transmits, outputs) to the UE 104 a first ($1^{st}$) scheduling-related parameter value predicted by the scheduler. The determination of when to communicate the predicted scheduling-related parameter value to the UE 104 (e.g., share the predicted parameters with the UE 104) can be based on network implementation, so whenever the network (e.g., the NE 102) chooses it shares its prediction, such as when a confidence measure in the predicted scheduling-related parameter value is smaller than a threshold amount.

At 704, the UE 104 determines a time window. The time window can be determined in various manners as discussed above, such as based on a time indicated by the NE 102 and a configured time window length, an indication of a time window length and a determined reference time.

At 706, the UE 104 determines a second scheduling-related parameter value corresponding to the time window. The second scheduling-related parameter value may be, for example, the actual value of the scheduling-related parameter at the UE 104 during or based on the time window.

At 708, the UE 104 determines whether a function F3 is less than or equal to (or just less than) a threshold value. The function F3 is based on a function F1 of the $1^{st}$ scheduling-related parameter value and function F2 of the $2^{nd}$ scheduling-related parameter value. The function F3 can be, for example, a function that determines the absolute value of the difference between the $1^{st}$ scheduling-related parameter value and the $2^{nd}$ scheduling-related parameter value.

At 710, the UE 104 triggers a report associated with the predicted scheduling-related parameter value if the function F3 is less than or equal to (or just less than) a threshold value. If the function F3 is not less than or equal to (or just less than) the threshold value, no such report is triggered.

At 712, the UE 104 communicates (e.g., sends, transmits, outputs) the triggered report to the NE 102.

The example 700 is discussed with reference to a first scheduling-related parameter value. It should be noted that the example 700 can be repeated for scheduling-related parameter values for multiple different scheduling-related parameters, or that the example 700 can be performed for scheduling-related parameter values for multiple different scheduling-related parameters concurrently.

Returning to FIG. 1, the NE 102 (e.g., a base station) can send the DCI if a certainty or confidence measure associated to the predicted scheduling-related parameter (e.g., the first scheduling-related parameter) is smaller than a threshold.

The second scheduling-related parameter value (e.g., the actual parameter value) can be an offset to the sent first scheduling-related parameter value (e.g., the predicted parameter value), e.g., if the second scheduling-related parameter is sent in a UCI.

The first RLB and second RLB can be associated with a set of LCGs, e.g., in a case of multi-modal.

The first RLB and second RLB can contain information about the volume of data pending in the buffer (e.g., associated with the LCG), and the UE 104 computes the difference based on at least one of the remaining latency budget or the volume of data pending in the buffer. There could be separate thresholds configured for the remaining latency budget and for the volume of data pending in the buffer. The UE 104 can trigger a DSR in case one or both thresholds are exceeded.

The first scheduling-related parameter may indicate incomplete information, for instance, the first RLB may indicate 'N/A' for the remaining latency budget or for the volume of data pending in the buffer.

The BSR table that the first RLB is associated with can be different than the BSR table the second RLB is associated with. There can be a field indicating which BSR table is associated with each RLB. If the UE 104 indicates an offset to the first scheduling-related parameter, the offset can be chosen from a configured lookup table. In case of RLB, the offset can be indicated from a configured BSR table which can be different than the BSR table for the associated LCG. The configured BSR table could be a regular BSR table, whereas the BSR table associated with the LCG could be a Refined Long BSR table.

The scheduling-related parameter can be power headroom. The network (e.g., a NE 102 such as a base station) can send the first scheduling-related parameter (e.g., the predicted parameter value), which shows the prediction of the power headroom associated with an UL-SCH transmission per activated serving cell. The UL-SCH can be the PUSCH that is scheduled by the same DCI which shares the first scheduling-related parameter. In one or more implementations, the first indication or first signaling (e.g., communicating the one or more predicted parameter values 404 of FIG. 4 or the one or more predicted parameter values 504 of FIG. 5) can be a DCI. The UE 104 constructs a UCI that includes the PHR, and multiplexes the UCI in the UL-SCH. The UE 104 can consider the DCI as a PHR trigger if the first scheduling-related parameter (PH) is different than the PH computed by the UE 104 corresponding to the UL-SCH by more than a threshold. If a PHR-prohibit timer is already running, the UE 104 can assume the timer is expired, or the UE considers the trigger after the expiry of the PHR-prohibit timer.

Additionally or alternatively, the first indication or first signaling (e.g., communicating the one or more predicted parameter values 404 of FIG. 4 or the one or more predicted parameter values 504 of FIG. 5) can be a MAC CE. The MAC CE is considered as the PHR trigger if the first scheduling-related parameter (PH) is different than the PH computed by the UE 104 (e.g., corresponding to a reference (or indicated) UL-SCH) by more than a threshold. A time index corresponding to the UL-SCH can be indicated in the MAC CE. The UL-SCH can occur enough time after the MAC CE or occur prior or not later than the MAC CE.

A field in the first indication or first signaling (e.g., communicating the one or more predicted parameter values 404 of FIG. 4 or the one or more predicted parameter values 504 of FIG. 5) can indicate the type or attribute of the first scheduling-related parameter (e.g., the predicted parameter value). For instance, the field can indicate whether the first scheduling-related parameter is a RLB or a PH.

The scheduling-related parameter can be timing advance (e.g., for non-terrestrial network or an air to ground network).

The UE 104 can send the report (the second scheduling-related parameter (e.g., the actual parameter value)) according to the first indication or first signaling (e.g., communicating the one or more predicted parameter values 404 of FIG. 4 or the one or more predicted parameter values 504 of FIG. 5). For example, if the first indication provides information (such as RLB and buffer size) for a single LCG, the UE 104 provides the report for the single LCG or alternatively as before or provides the report for the single LCG and additional LCGs.

The MAC entity includes a DSR MAC CE prepared in response to the first scheduling-related parameter (e.g., the predicted parameter value) in a MAC PDU if the MAC PDU can accommodate the DSR MAC CE even if the MAC PDU can accommodate the SDUs associated with all the pending DSRs. The MAC entity need not (e.g., does not) include a DSR MAC CE (other than prepared in response to the first scheduling-related parameter) in a MAC PDU if the MAC PDU can accommodate the SDUs associated with all the pending DSRs.

After a DSR is triggered, the DSR is considered as pending until the DSR is cancelled. The MAC entity cancels a pending DSR, when all the SDUs associated with the DSR have been discarded, or when a MAC PDU is transmitted and this MAC PDU includes all the SDUs associated with the DSR or a DSR MAC CE that contains the delay information of all the SDUs associated with the DSR. The MAC entity need not (e.g., does not) cancel a pending DSR (triggered in response to the first scheduling-related parameter), when all the SDUs associated with the DSR have been discarded, or when a MAC PDU is transmitted and this MAC PDU includes all the SDUs associated with the DSR or a DSR MAC CE that contains the delay information of all the SDUs associated with the DSR. The UE 104 may send negative values for the second scheduling-related parameter (e.g., the actual parameter value) if all the SDUs associated with the DSR have been discarded If an LCG is configured for delay status reporting, if the smallest remaining value of the PDCP discardTimers among all the data buffered for the LCG that has not been transmitted in any MAC PDU or reported as data volume in a DSR MAC CE becomes below remainingTimeThreshold of the LCG or if the UE 104 has received the first indication, and the first scheduling-related parameter is associated with a delay status of the LCG, and if there is no DSR pending for the LCG since the last transmission of a DSR MAC CE, the MAC entity triggers a DSR for the LCG. It should be noted that the indicated remaining value of PDCP discardTimer for the second scheduling-related parameter can be different than possible values when DSR is triggered by a method other than the first scheduling-related parameter (e.g., the predicted parameter value) indication.

Accordingly, discussed herein is triggering a report (such as BSR, DSR, PHR) via reception of an indication from the network, and by comparing a first value in the indication with a second value determined by the UE; where the indicated and the determined values correspond to a network monitoring parameter (such as buffer size, delay status, and power headroom). Determining the second value at a reference time determined based on the indication is also discussed herein.

A rule regarding whether to include a DSR MAC CE in a MAC PDU based on the indication is discussed herein. DCI and MAC CE design for signaling the indication is also discussed herein. DCI can indicate a subset of scheduling-related parameter (e.g., buffer size), and MAC CE could indicate for which LCG.

Also discussed herein is feedback, if needed, to correct predicted scheduling parameters (such as buffer size, remaining latency budget, power headroom) for a learning model (e.g., an AI/ML-based scheduler).

A power headroom, delay status, or buffer status report trigger via network indication (such as MAC CE/DCI) of network-predicted power headroom, delay status, buffer status, and comparing, at the UE-side, with a UE-determined power headroom/delay status/buffer status is discussed herein. Considering DCI size limitations, some associated fields are RRC or MAC CE indicated as discussed herein. Methods to compute the difference between predicted and UE calculated or determined scheduling parameters (since the scheduling-related parameters (such as buffer size, remaining latency budget, power headroom) are time-dependent) are discussed herein.

Some of the techniques discussed herein can also be used in a scheme in which the network (e.g., an NE 102 such as a base station) can send a request or indication to the UE to report scheduling-related parameters such as BSR, DSR, and PHR. Examples of such techniques include details of the request or indication, determining a reference time for calculating the scheduling-related parameter, a rule regarding whether to include a DSR MAC CE in a MAC PDU based on the indication, and so forth.

Figure 8:
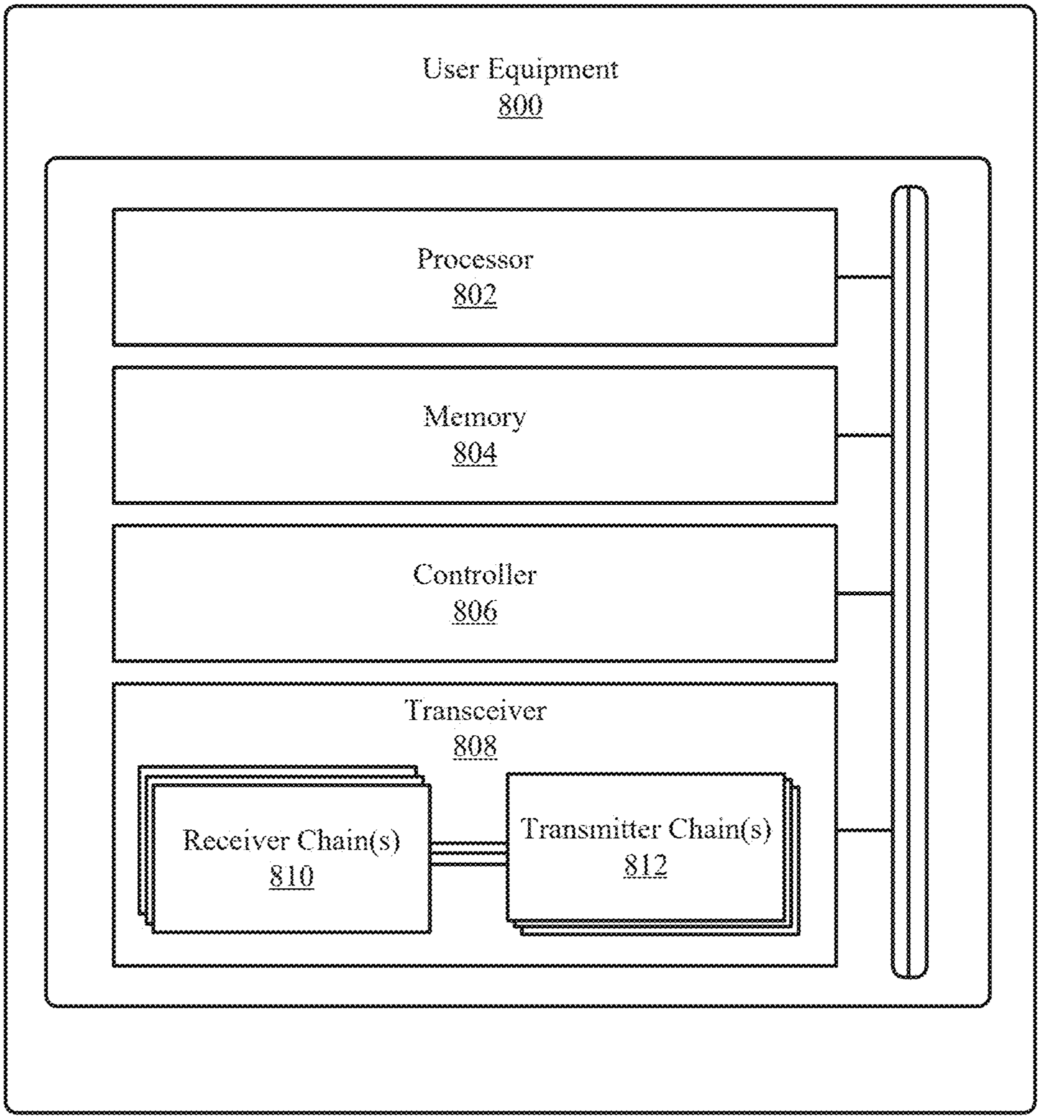
FIG. 8 illustrates an example of a UE in accordance with aspects of the present disclosure.

FIG. 8 illustrates an example of a UE 800 in accordance with aspects of the present disclosure. The UE 800 may include a processor 802, a memory 804, a controller 806, and a transceiver 808. The processor 802, the memory 804, the controller 806, or the transceiver 808, or various combinations thereof or various components thereof may be examples of means for performing various aspects of the present disclosure as described herein. These components may be coupled (e.g., operatively, communicatively, functionally, electronically, electrically) via one or more interfaces.

The processor 802, the memory 804, the controller 806, or the transceiver 808, or various combinations or components thereof may be implemented in hardware (e.g., circuitry). The hardware may include a processor, a digital signal processor (DSP), an application-specific integrated circuit (ASIC), or other programmable logic device, or any combination thereof configured as or otherwise supporting a means for performing the functions described in the present disclosure.

The processor 802 may include an intelligent hardware device (e.g., a general-purpose processor, a DSP, a CPU, an ASIC, an FPGA, or any combination thereof). In some implementations, the processor 802 may be configured to operate the memory 804. In some other implementations, the memory 804 may be integrated into the processor 802. The processor 802 may be configured to execute computer-readable instructions stored in the memory 804 to cause the UE 800 to perform various functions of the present disclosure.

The memory 804 may include volatile or non-volatile memory. The memory 804 may store computer-readable, computer-executable code including instructions when executed by the processor 802 cause the UE 800 to perform various functions described herein. The code may be stored in a non-transitory computer-readable medium such as the memory 804 or another type of memory. Computer-readable media includes both non-transitory computer storage media and communication media including any medium that facilitates transfer of a computer program from one place to another. A non-transitory storage medium may be any available medium that may be accessed by a general-purpose or special-purpose computer.

In some implementations, the processor 802 and the memory 804 coupled with the processor 802 may be configured to cause the UE 800 to perform one or more of the functions described herein (e.g., executing, by the processor 802, instructions stored in the memory 804). For example, the processor 802 may support wireless communication at the UE 800 in accordance with examples as disclosed herein. The UE 800 may be configured to or operable to support a means for receiving a first signaling indicating a first value for a scheduling-related parameter for a learning model; determining a second value for the scheduling-related parameter, and in response to a difference between the first value of the scheduling-related parameter and the second value of the scheduling-related parameter satisfying a threshold value, at least one of triggering a report associated with the first scheduling-related parameter, or transmitting a second signaling indicating a result of a function of the first value of the scheduling-related parameter and the second value of the scheduling-related parameter.

Additionally, the UE 800 may be configured to support any one or combination of where the learning model comprises a learning-based scheduler, and where the scheduling-related parameter comprises at least one of a remaining latency budget, a UE buffer status, or a power headroom; determining a reference time; and determining the second scheduling-related parameter value based at least in part on the first signaling and the reference time; determining, based at least in part on the first signaling, whether to include the report in an UL data transmission; where the triggered report indicates a remaining latency budget associated with a traffic flow, and further including the report in the UL data transmission regardless of whether the UL data transmission can accommodate data units associated with all pending reports that include remaining latency budget associated with one or more traffic flows; receiving a second signaling that requests a delay status report; and transmitting the delay status report regardless of whether data units associated with the delay status report have been discarded; canceling the triggered report in response to all data units associated with the triggered report having been discarded, where the report is not triggered in response to receiving a second signaling from a network; where the report includes at least one of: a buffer size associated with a logical channel group, a remaining time associated with one or more PDCP discard-Timers among SDUs buffered for the logical channel group, or a difference between a nominal UE maximum transmit power and an estimated power for an UL transmission in an activated serving cell; where the triggered report is one of multiple report types each having a corresponding threshold, and further receiving a second signaling indicating the corresponding threshold for each of the multiple report types, where the second signaling comprises MAC CE or RRC signaling, and where the multiple report types include a buffer status report, a delay status report, and a power headroom report; where the function of the first value of the scheduling-related parameter and the second value of the scheduling-related parameter is an absolute value of a difference between the first value of the scheduling-related parameter and the second value of the scheduling-related parameter; where at least one of a LCG, a buffer size table, a delay size table, or a serving cell is indicated by a MAC CE or RRC signaling, and where the PDCCH includes a DCI that includes at least one field that indicates at least one of: a buffer size that is associated with the LCG and the buffer size table; a RLB associated with the LCG, the delay size table, and the buffer size table; or a power headroom that is associated with the serving cell and an UL transmission; determining the UL transmission based at least in part on the first signaling.

Additionally, or alternatively, the UE 800 may support at least one memory (e.g., the memory 804) and at least one processor (e.g., the processor 802) coupled with the at least one memory and configured to cause the UE to: receive a first signaling indicating a first value for a scheduling-related parameter for a learning model; determine a second value for the scheduling-related parameter; in response to a difference between the first value of the scheduling-related parameter and the second value of the scheduling-related parameter satisfying a threshold value, at least one of trigger a report associated with the first scheduling-related parameter, or transmit a second signaling indicating a result of a function of the first value of the scheduling-related parameter and the second value of the scheduling-related parameter.

Additionally, the UE 800 may be configured to support any one or combination of the at least one processor is configured to where the learning model comprises a learning-based scheduler, and where the scheduling-related parameter comprises at least one of a remaining latency budget, a UE buffer status, or a power headroom; where the at least one processor is further configured to cause the UE to: determine a reference time; and determine the second scheduling-related parameter value based at least in part on the first signaling and the reference time; where the at least one processor is further configured to cause the UE to determine, based at least in part on the first signaling, whether to include the report in an UL data transmission; where the triggered report indicates a remaining latency budget associated with a traffic flow, and the at least one processor is further configured to cause the UE to include the report in the UL data transmission regardless of whether the UL data transmission can accommodate data units associated with all pending reports that include remaining latency budget associated with one or more traffic flows; where the at least one processor is further configured to cause the UE to: receive a second signaling that requests a delay status report; and transmit the delay status report regardless of whether data units associated with the delay status report have been discarded; where the at least one processor is further configured to cause the UE to: cancel the triggered report in response to all data units associated with the triggered report having been discarded, where the report is not triggered in response to receiving a second signaling from a network; where the report includes at least one of: a buffer size associated with a logical channel group, a remaining time associated with one or more PDCP discard-Timers among SDUs buffered for the logical channel group, or a difference between a nominal UE maximum transmit power and an estimated power for an UL transmission in an activated serving cell; where the triggered report is one of multiple report types each having a corresponding threshold, and where the at least one processor is further configured to cause the UE to: receive a second signaling indicating the corresponding threshold for each of the multiple report types, where the second signaling comprises MAC CE or RRC signaling, and where the multiple report types include a buffer status report, a delay status report, and a power headroom report; where the function of the first value of the scheduling-related parameter and the second value of the scheduling-related parameter is an absolute value of a difference between the first value of the scheduling-related parameter and the second value of the scheduling-related parameter; where the first signaling comprises a PDCCH, where at least one of a LCG, a buffer size table, a delay size table, or a serving cell is indicated by a MAC CE or RRC signaling, and where the PDCCH includes a DCI that includes at least one field that indicates at least one of: a buffer size that is associated with the LCG and the buffer size table; a RLB associated with the LCG, the delay size table, and the buffer size table; or a power headroom that is associated with the serving cell and an UL transmission; where the at least one processor is further configured to cause the UE to determine the UL transmission based at least in part on the first signaling.

The controller 806 may manage input and output signals for the UE 800. The controller 806 may also manage peripherals not integrated into the UE 800. In some implementations, the controller 806 may utilize an operating system such as iOS®, ANDROID®, WINDOWS®, or other operating systems. In some implementations, the controller 806 may be implemented as part of the processor 802.

In some implementations, the UE 800 may include at least one transceiver 808. In some other implementations, the UE 800 may have more than one transceiver 808. The transceiver 808 may represent a wireless transceiver. The transceiver 808 may include one or more receiver chains 810, one or more transmitter chains 812, or a combination thereof.

A receiver chain 810 may be configured to receive signals (e.g., control information, data, packets) over a wireless medium. For example, the receiver chain 810 may include one or more antennas to receive a signal over the air or wireless medium. The receiver chain 810 may include at least one amplifier (e.g., a low-noise amplifier (LNA)) configured to amplify the received signal. The receiver chain 810 may include at least one demodulator configured to demodulate the receive signal and obtain the transmitted data by reversing the modulation technique applied during transmission of the signal. The receiver chain 810 may include at least one decoder for decoding the demodulated signal to receive the transmitted data.

A transmitter chain 812 may be configured to generate and transmit signals (e.g., control information, data, packets). The transmitter chain 812 may include at least one modulator for modulating data onto a carrier signal, preparing the signal for transmission over a wireless medium. The at least one modulator may be configured to support one or more techniques such as amplitude modulation (AM), frequency modulation (FM), or digital modulation schemes like phase-shift keying (PSK) or quadrature amplitude modulation (QAM). The transmitter chain 812 may also include at least one power amplifier configured to amplify the modulated signal to an appropriate power level suitable for transmission over the wireless medium. The transmitter chain 812 may also include one or more antennas for transmitting the amplified signal into the air or wireless medium.

Figure 9:
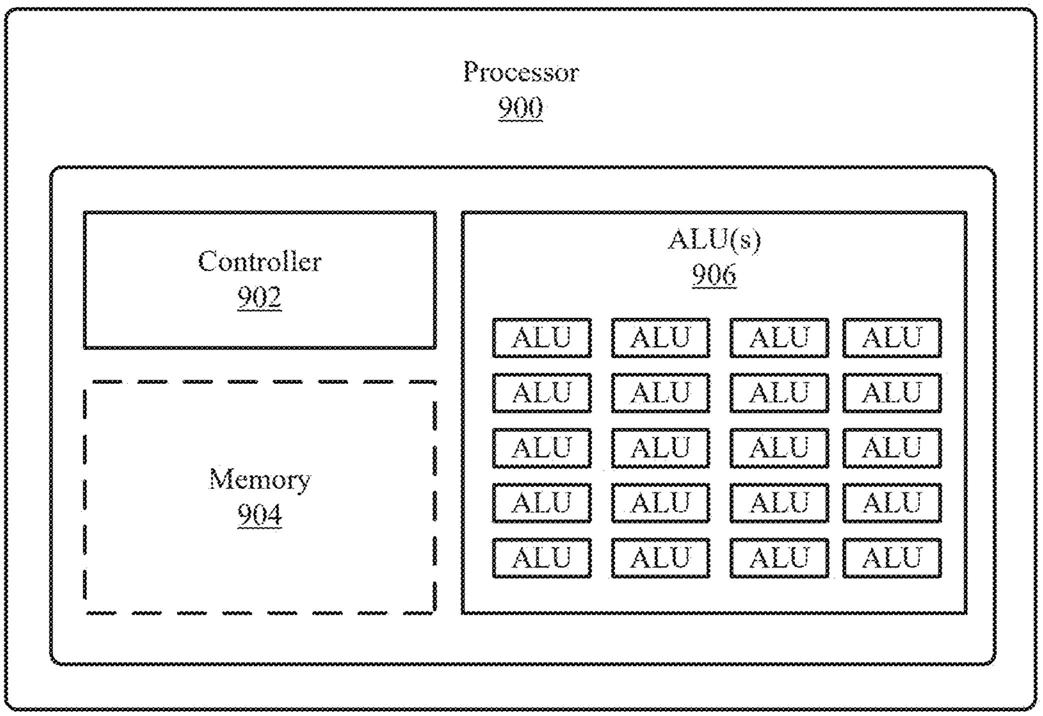
FIG. 9 illustrates an example of a processor in accordance with aspects of the present disclosure.

FIG. 9 illustrates an example of a processor 900 in accordance with aspects of the present disclosure. The processor 900 may be an example of a processor configured to perform various operations in accordance with examples as described herein. The processor 900 may include a controller 902 configured to perform various operations in accordance with examples as described herein. The processor 900 may optionally include at least one memory 904, which may be, for example, an L1/L2/L3 cache. Additionally, or alternatively, the processor 900 may optionally include one or more arithmetic-logic units (ALUs) 906. One or more of these components may be in electronic communication or otherwise coupled (e.g., operatively, communicatively, functionally, electronically, electrically) via one or more interfaces (e.g., buses).

The processor 900 may be a processor chipset and include a protocol stack (e.g., a software stack) executed by the processor chipset to perform various operations (e.g., receiving, obtaining, retrieving, transmitting, outputting, forwarding, storing, determining, identifying, accessing, writing, reading) in accordance with examples as described herein. The processor chipset may include one or more cores, one or more caches (e.g., memory local to or included in the processor chipset (e.g., the processor 900) or other memory (e.g., random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), and others), The controller 902 may be configured to manage and coordinate various operations (e.g., signaling, receiving, obtaining, retrieving, transmitting, outputting, forwarding, storing, determining, identifying, accessing, writing, reading) of the processor 900 to cause the processor 900 to support various operations in accordance with examples as described herein. For example, the controller 902 may operate as a control unit of the processor 900, generating control signals that manage the operation of various components of the processor 900. These control signals include enabling or disabling functional units, selecting data paths, initiating memory access, and coordinating timing of operations.

The controller 902 may be configured to fetch (e.g., obtain, retrieve, receive) instructions from the memory 904 and determine subsequent instruction(s) to be executed to cause the processor 900 to support various operations in accordance with examples as described herein. The controller 902 may be configured to track memory addresses of instructions associated with the memory 904. The controller 902 may be configured to decode instructions to determine the operation to be performed and the operands involved. For example, the controller 902 may be configured to interpret the instruction and determine control signals to be output to other components of the processor 900 to cause the processor 900 to support various operations in accordance with examples as described herein. Additionally, or alternatively, the controller 902 may be configured to manage flow of data within the processor 900. The controller 902 may be configured to control transfer of data between registers, ALUs 906, and other functional units of the processor 900.

The memory 904 may include one or more caches (e.g., memory local to or included in the processor 900 or other memory, such as RAM, ROM, DRAM, SDRAM, SRAM, MRAM, flash memory, etc. In some implementations, the memory 904 may reside within or on a processor chipset (e.g., local to the processor 900). In some other implementations, the memory 904 may reside external to the processor chipset (e.g., remote to the processor 900).

The memory 904 may store computer-readable, computer-executable code including instructions that, when executed by the processor 900, cause the processor 900 to perform various functions described herein. The code may be stored in a non-transitory computer-readable medium such as system memory or another type of memory. The controller 902 and/or the processor 900 may be configured to execute computer-readable instructions stored in the memory 904 to cause the processor 900 to perform various functions. For example, the processor 900 and/or the controller 902 may be coupled with or to the memory 904, the processor 900, and the controller 902, and may be configured to perform various functions described herein. In some examples, the processor 900 may include multiple processors and the memory 904 may include multiple memories.

One or more of the multiple processors may be coupled with one or more of the multiple memories, which may, individually or collectively, be configured to perform various functions herein.

The one or more ALUs 906 may be configured to support various operations in accordance with examples as described herein. In some implementations, the one or more ALUs 906 may reside within or on a processor chipset (e.g., the processor 900). In some other implementations, the one or more ALUs 906 may reside external to the processor chipset (e.g., the processor 900). One or more ALUs 906 may perform one or more computations such as addition, subtraction, multiplication, and division on data. For example, one or more ALUs 906 may receive input operands and an operation code, which determines an operation to be executed. One or more ALUs 906 may be configured with a variety of logical and arithmetic circuits, including adders, subtractors, shifters, and logic gates, to process and manipulate the data according to the operation. Additionally, or alternatively, the one or more ALUs 906 may support logical operations such as AND, OR, exclusive-OR (XOR), not-OR (NOR), and not-AND (NAND), enabling the one or more ALUs 906 to handle conditional operations, comparisons, and bitwise operations.

The processor 900 may support wireless communication in accordance with examples as disclosed herein. The processor 900 may be configured to or operable to support at least one controller (e.g., the controller 902) coupled with at least one memory (e.g., the memory 904) and configured to cause the processor to: receive a first signaling indicating a first value for a scheduling-related parameter for a learning model; determine a second value for the scheduling-related parameter; in response to a difference between the first value of the scheduling-related parameter and the second value of the scheduling-related parameter satisfying a threshold value, at least one of trigger a report associated with the first scheduling-related parameter, or transmit a second signaling indicating a result of a function of the first value of the scheduling-related parameter and the second value of the scheduling-related parameter.

Additionally, the processor 900 may be configured to or operable to support any one or combination of where the learning model comprises a learning-based scheduler, and where the scheduling-related parameter comprises at least one of a remaining latency budget, a buffer status, or a power headroom, where the at least one controller is further configured to cause the processor to: determine a reference time; and determine the second scheduling-related parameter value based at least in part on the first signaling and the reference time; where the at least one controller is further configured to cause the processor to determine, based at least in part on the first signaling, whether to include the report in an UL data transmission, where the triggered report indicates a remaining latency budget associated with a traffic flow, and the at least one controller is further configured to cause the processor to include the report in the UL data transmission regardless of whether the UL data transmission can accommodate data units associated with all pending reports that include remaining latency budget associated with one or more traffic flows; where the at least one controller is further configured to cause the processor to: receive a second signaling that requests a delay status report; and transmit the delay status report regardless of whether data units associated with the delay status report have been discarded; where the at least one controller is further configured to cause the processor to: cancel the triggered report in response to all data units associated with the triggered report having been discarded, where the report is not triggered in response to receiving a second signaling from a network; where the report includes at least one of: a buffer size associated with a logical channel group, a remaining time associated with one or more PDCP discardTimers among SDUs buffered for the logical channel group, or a difference between a nominal UE maximum transmit power and an estimated power for an UL transmission in an activated serving cell; where the triggered report is one of multiple report types each having a corresponding threshold, and where the at least one controller is further configured to cause the processor to: receive a second signaling indicating the corresponding threshold for each of the multiple report types, where the second signaling comprises MAC CE or RRC signaling, and where the multiple report types include a buffer status report, a delay status report, and a power headroom report; where the function of the first value of the scheduling-related parameter and the second value of the scheduling-related parameter is an absolute value of a difference between the first value of the scheduling-related parameter and the second value of the scheduling-related parameter; where the first signaling comprises a PDCCH, where at least one of a LCG, a buffer size table, a delay size table, or a serving cell is indicated by a MAC CE or RRC signaling, and where the PDCCH includes a DCI that includes at least one field that indicates at least one of: a buffer size that is associated with the LCG and the buffer size table; a RLB associated with the LCG, the delay size table, and the buffer size table; or a power headroom that is associated with the serving cell and an UL transmission; where the at least one controller is further configured to cause the processor to determine the UL transmission based at least in part on the first signaling.

Figure 10:
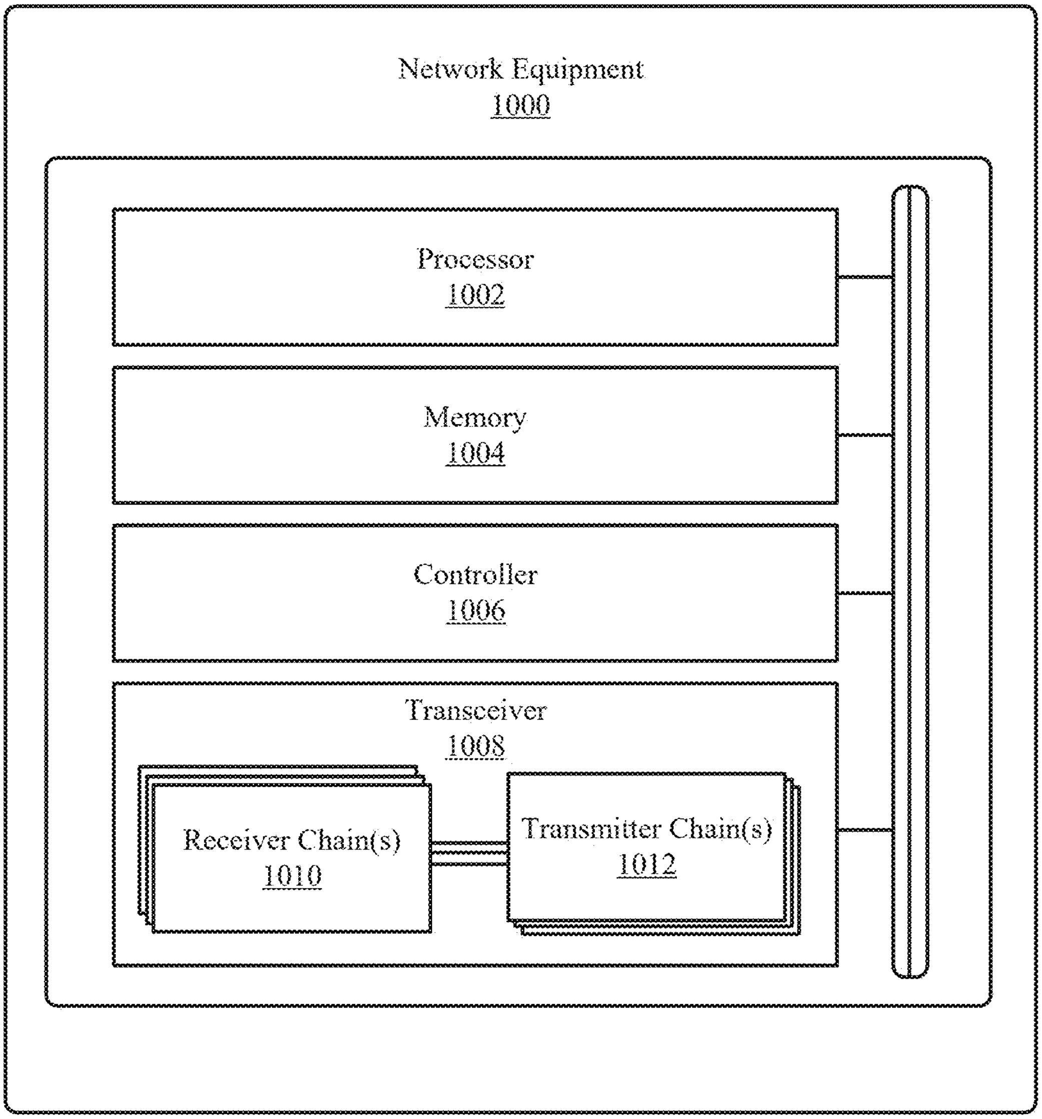
FIG. 10 illustrates an example of a network equipment (NE) in accordance with aspects of the present disclosure.

FIG. 10 illustrates an example of a NE 1000 in accordance with aspects of the present disclosure. The NE 1000 may include a processor 1002, a memory 1004, a controller 1006, and a transceiver 1008. The processor 1002, the memory 1004, the controller 1006, or the transceiver 1008, or various combinations thereof or various components thereof may be examples of means for performing various aspects of the present disclosure as described herein. These components may be coupled (e.g., operatively, communicatively, functionally, electronically, electrically) via one or more interfaces.

The processor 1002, the memory 1004, the controller 1006, or the transceiver 1008, or various combinations or components thereof may be implemented in hardware (e.g., circuitry). The hardware may include a processor, a digital signal processor (DSP), an application-specific integrated circuit (ASIC), or other programmable logic device, or any combination thereof configured as or otherwise supporting a means for performing the functions described in the present disclosure.

The processor 1002 may include an intelligent hardware device (e.g., a general-purpose processor, a DSP, a CPU, an ASIC, an FPGA, or any combination thereof). In some implementations, the processor 1002 may be configured to operate the memory 1004. In some other implementations, the memory 1004 may be integrated into the processor 1002. The processor 1002 may be configured to execute computer-readable instructions stored in the memory 1004 to cause the NE 1000 to perform various functions of the present disclosure.

The memory 1004 may include volatile or non-volatile memory. The memory 1004 may store computer-readable, computer-executable code including instructions when executed by the processor 1002 cause the NE 1000 to perform various functions described herein. The code may be stored in a non-transitory computer-readable medium such as the memory 1004 or another type of memory. Computer-readable media includes both non-transitory computer storage media and communication media including any medium that facilitates transfer of a computer program from one place to another. A non-transitory storage medium may be any available medium that may be accessed by a general-purpose or special-purpose computer.

In some implementations, the processor 1002 and the memory 1004 coupled with the processor 1002 may be configured to cause the NE 1000 to perform one or more of the functions described herein (e.g., executing, by the processor 1002, instructions stored in the memory 1004). For example, the processor 1002 may support wireless communication at the NE 1000 in accordance with examples as disclosed herein. The NE 1000 may be configured to support a means for transmitting a first signaling indicating a first value for a scheduling-related parameter for a learning model; receiving a second signaling indicating a result of a function of the first value of the scheduling-related parameter and a second value of the scheduling-related parameter.

Additionally, the NE 1000 may be configured to support any one or combination of where the learning model comprises a learning-based scheduler, and where the scheduling-related parameter comprises at least one of a remaining latency budget, a UE buffer status, or a power headroom; where the triggered report indicates a remaining latency budget associated with a traffic flow, and receiving the report in a UL data transmission regardless of whether the UL data transmission can accommodate data units associated with all pending reports that include remaining latency budget associated with one or more traffic flows; transmitting a second signaling that requests a delay status report; and receiving the delay status report regardless of whether data units associated with the delay status report have been discarded; where the report includes at least one of: a buffer size associated with a logical channel group, a remaining time associated with one or more PDCP discardTimers among SDUs buffered for the logical channel group, or a difference between a nominal UE maximum transmit power and an estimated power for an UL transmission in an activated serving cell; where the triggered report is one of multiple report types each having a corresponding threshold, and transmitting a second signaling indicating the corresponding threshold for each of the multiple report types, where the second signaling comprises MAC CE or RRC signaling, and where the multiple report types include a buffer status report, a delay status report, and a power headroom report; where the function of the first value of the scheduling-related parameter and the second value of the scheduling-related parameter is an absolute value of a difference between the first value of the scheduling-related parameter and the second value of the scheduling-related parameter; where the first signaling comprises a PDCCH, where at least one of a LCG, a buffer size table, a delay size table, or a serving cell is indicated by a MAC CE or RRC signaling, and where the PDCCH includes a DCI that includes at least one field that indicates at least one of: a buffer size that is associated with the LCG and the buffer size table; a RLB associated with the LCG, the delay size table, and the buffer size table; or a power headroom that is associated with the serving cell and an UL transmission.

Additionally, or alternatively, the NE 1000 may support at least one memory (e.g., the memory 1004) and at least one processor (e.g., the processor 1002) coupled with the at least one memory and configured to cause the NE to: transmit a first signaling indicating a first value for a scheduling-related parameter for a learning model; receive a second signaling indicating a result of a function of the first value of the scheduling-related parameter and a second value of the scheduling-related parameter.

Additionally, the NE 1000 may be configured to support any one or combination of the at least one processor is configured to cause the NE to where the learning model comprises a learning-based scheduler, and where the scheduling-related parameter comprises at least one of a remaining latency budget, a UE buffer status, or a power headroom; where the triggered report indicates a remaining latency budget associated with a traffic flow, and the at least one processor is further configured to cause the NE to receive the report in a UL data transmission regardless of whether the UL data transmission can accommodate data units associated with all pending reports that include remaining latency budget associated with one or more traffic flows; where the at least one processor is further configured to cause the NE to: transmit a second signaling that requests a delay status report; and receive the delay status report regardless of whether data units associated with the delay status report have been discarded; where the report includes at least one of: a buffer size associated with a logical channel group, a remaining time associated with one or more PDCP discardTimers among SDUs buffered for the logical channel group, or a difference between a nominal UE maximum transmit power and an estimated power for an UL transmission in an activated serving cell; where the triggered report is one of multiple report types each having a corresponding threshold, and where the at least one processor is further configured to cause the NE to: transmit a second signaling indicating the corresponding threshold for each of the multiple report types, where the second signaling comprises MAC CE or RRC signaling, and where the multiple report types include a buffer status report, a delay status report, and a power headroom report; where the function of the first value of the scheduling-related parameter and the second value of the scheduling-related parameter is an absolute value of a difference between the first value of the scheduling-related parameter and the second value of the scheduling-related parameter; where the first signaling comprises a PDCCH, where at least one of a LCG, a buffer size table, a delay size table, or a serving cell is indicated by a MAC CE or RRC signaling, and where the PDCCH includes a DCI that includes at least one field that indicates at least one of: a buffer size that is associated with the LCG and the buffer size table; a RLB associated with the LCG, the delay size table, and the buffer size table; or a power headroom that is associated with the serving cell and an UL transmission.

The controller 1006 may manage input and output signals for the NE 1000. The controller 1006 may also manage peripherals not integrated into the NE 1000. In some implementations, the controller 1006 may utilize an operating system such as iOS®, ANDROID®, WINDOWS®, or other operating systems. In some implementations, the controller 1006 may be implemented as part of the processor 1002.

In some implementations, the NE 1000 may include at least one transceiver 1008. In some other implementations, the NE 1000 may have more than one transceiver 1008. The transceiver 1008 may represent a wireless transceiver. The transceiver 1008 may include one or more receiver chains 1010, one or more transmitter chains 1012, or a combination thereof.

A receiver chain 1010 may be configured to receive signals (e.g., control information, data, packets) over a wireless medium. For example, the receiver chain 1010 may include one or more antennas to receive a signal over the air or wireless medium. The receiver chain 1010 may include at least one amplifier (e.g., a low-noise amplifier (LNA)) configured to amplify the received signal. The receiver chain 1010 may include at least one demodulator configured to demodulate the receive signal and obtain the transmitted data by reversing the modulation technique applied during transmission of the signal. The receiver chain 1010 may include at least one decoder for decoding the demodulated signal to receive the transmitted data.

A transmitter chain 1012 may be configured to generate and transmit signals (e.g., control information, data, packets). The transmitter chain 1012 may include at least one modulator for modulating data onto a carrier signal, preparing the signal for transmission over a wireless medium. The at least one modulator may be configured to support one or more techniques such as amplitude modulation (AM), frequency modulation (FM), or digital modulation schemes like phase-shift keying (PSK) or quadrature amplitude modulation (QAM). The transmitter chain 1012 may also include at least one power amplifier configured to amplify the modulated signal to an appropriate power level suitable for transmission over the wireless medium. The transmitter chain 1012 may also include one or more antennas for transmitting the amplified signal into the air or wireless medium.

Figure 11:
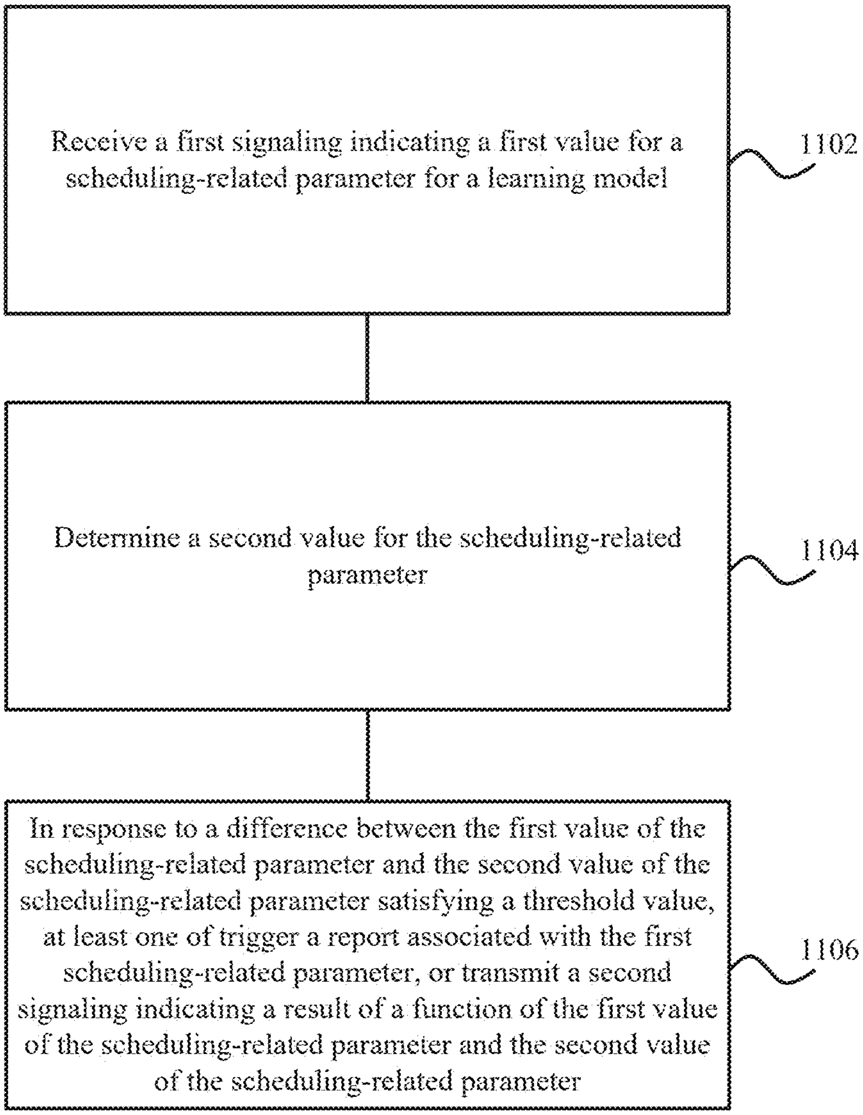
FIG. 11 illustrates a flowchart of a method performed by a UE in accordance with aspects of the present disclosure.

FIG. 11 illustrates a flowchart of a method in accordance with aspects of the present disclosure. The operations of the method may be implemented by a UE as described herein. In some implementations, the UE may execute a set of instructions to control the function elements of the UE to perform the described functions.

At 1102, the method may include receiving a first signaling indicating a first value for a scheduling-related parameter for a learning model. The operations of 1102 may be performed in accordance with examples as described herein. In some implementations, aspects of the operations of 1102 may be performed by a UE as described with reference to FIG. 8.

At 1104, the method may include determining a second value for the scheduling-related parameter. The operations of 1104 may be performed in accordance with examples as described herein. In some implementations, aspects of the operations of 1104 may be performed by a UE as described with reference to FIG. 8.

At 1106, the method may include in response to a difference between the first value of the scheduling-related parameter and the second value of the scheduling-related parameter satisfying a threshold value, at least one of triggering a report associated with the first scheduling-related parameter, or transmitting a second signaling indicating a result of a function of the first value of the scheduling-related parameter and the second value of the scheduling-related parameter. The operations of 1106 may be performed in accordance with examples as described herein. In some implementations, aspects of the operations of 1106 may be performed a UE as described with reference to FIG. 8.

It should be noted that the method described herein describes a possible implementation, and that the operations and the steps may be rearranged or otherwise modified and that other implementations are possible.

Figure 12:
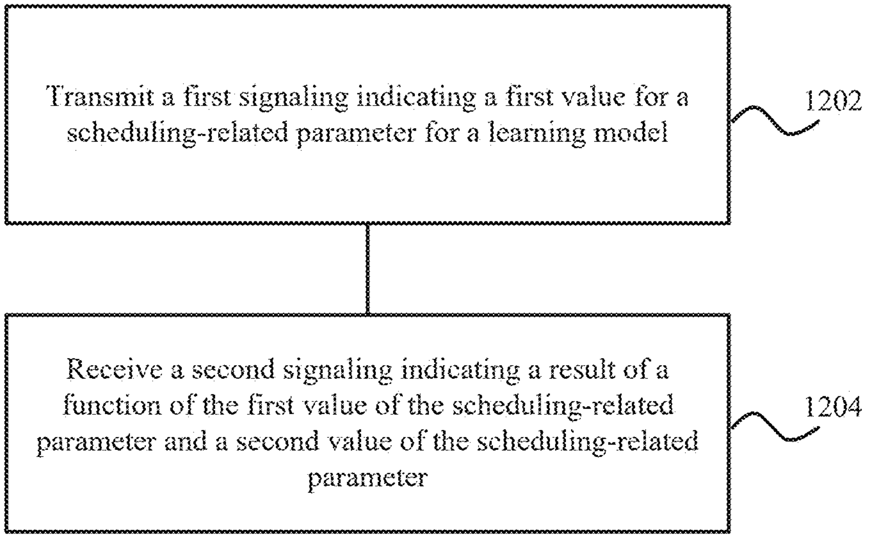
FIG. 12 illustrates a flowchart of a method performed by a NE in accordance with aspects of the present disclosure.

FIG. 12 illustrates a flowchart of a method in accordance with aspects of the present disclosure. The operations of the method may be implemented by a NE as described herein. In some implementations, the NE may execute a set of instructions to control the function elements of the NE to perform the described functions.

At 1202, the method may include transmitting a first signaling indicating a first value for a scheduling-related parameter for a learning model. The operations of 1202 may be performed in accordance with examples as described herein. In some implementations, aspects of the operations of 1202 may be performed by a NE as described with reference to FIG. 10.

At 1204, the method may include receiving a second signaling indicating a result of a function of the first value of the scheduling-related parameter and a second value of the scheduling-related parameter. The operations of 1204 may be performed in accordance with examples as described herein. In some implementations, aspects of the operations of 1204 may be performed by a NE as described with reference to FIG. 10.

It should be noted that the method described herein describes a possible implementation, and that the operations and the steps may be rearranged or otherwise modified and that other implementations are possible.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE) for wireless communication, comprising:

at least one memory; and at least one processor coupled with the at least one memory and configured to cause the UE to:

receive a first signaling indicating a first value for a scheduling-related parameter for a learning model;

determine a second value for the scheduling-related parameter;

in response to a difference between the first value of the scheduling-related parameter and the second value of the scheduling-related parameter satisfying a threshold value, at least one of trigger a report associated with the first scheduling-related parameter, or transmit a second signaling indicating a result of a function of the first value of the scheduling-related parameter and the second value of the scheduling-related parameter.

2. The UE of claim 1, wherein the learning model comprises a learning-based scheduler, and wherein the scheduling-related parameter comprises at least one of a remaining latency budget, a UE buffer status, or a power headroom.

3. The UE of claim 1, wherein the at least one processor is further configured to cause the UE to:

determine a reference time; and determine the second scheduling-related parameter value based at least in part on the first signaling and the reference time.

4. The UE of claim 1, wherein the at least one processor is further configured to cause the UE to determine, based at least in part on the first signaling, whether to include the report in an uplink (UL) data transmission.

5. The UE of claim 4, wherein the triggered report indicates a remaining latency budget associated with a traffic flow, and the at least one processor is further configured to cause the UE to include the report in the UL data transmission regardless of whether the UL data transmission can accommodate data units associated with all pending reports that include remaining latency budget associated with one or more traffic flows.

6. The UE of claim 1, wherein the at least one processor is further configured to cause the UE to:

receive a second signaling that requests a delay status report; and transmit the delay status report regardless of whether data units associated with the delay status report have been discarded.

7. The UE of claim 1, wherein the at least one processor is further configured to cause the UE to:

cancel the triggered report in response to all data units associated with the triggered report having been discarded, wherein the report is not triggered in response to receiving a second signaling from a network.

8. The UE of claim 1, wherein the report includes at least one of:

a buffer size associated with a logical channel group, a remaining time associated with one or more packet data convergence protocol (PDCP) discardTimers among service data units (SDUs) buffered for the logical channel group, or a difference between a nominal UE maximum transmit power and an estimated power for an uplink (UL) transmission in an activated serving cell.

9. The UE of claim 1, wherein the triggered report is one of multiple report types each having a corresponding threshold, and wherein the at least one processor is further configured to cause the UE to:

receive a second signaling indicating the corresponding threshold for each of the multiple report types, wherein the second signaling comprises medium access control control element (MAC CE) or radio resource control (RRC) signaling, and wherein the multiple report types include a buffer status report, a delay status report, and a power headroom report.

10. The UE of claim 1, wherein the function of the first value of the scheduling-related parameter and the second value of the scheduling-related parameter is an absolute value of a difference between the first value of the scheduling-related parameter and the second value of the scheduling-related parameter.

11. The UE of claim 1, wherein the first signaling comprises a physical downlink control channel (PDCCH), wherein at least one of a logical channel group (LCG), a buffer size table, a delay size table, or a serving cell is indicated by a medium access control control element (MAC CE) or radio resource control (RRC) signaling, and wherein the PDCCH includes a downlink control information (DCI) that includes at least one field that indicates at least one of:

a buffer size that is associated with the LCG and the buffer size table;

a remaining latency budget (RLB) associated with the LCG, the delay size table, and the buffer size table; or a power headroom that is associated with the serving cell and an UL transmission.

12. The UE of claim 11, wherein the at least one processor is further configured to cause the UE to determine the UL transmission based at least in part on the first signaling.

13. A processor for wireless communication, comprising:

at least one controller coupled with at least one memory and configured to cause the processor to:

receive a first signaling indicating a first value for a scheduling-related parameter for a learning model;

determine a second value for the scheduling-related parameter;

in response to a difference between the first value of the scheduling-related parameter and the second value of the scheduling-related parameter satisfying a threshold value, at least one of trigger a report associated with the first scheduling-related parameter, or transmit a second signaling indicating a result of a function of the first value of the scheduling-related parameter and the second value of the scheduling-related parameter.

14. The processor of claim 13, wherein the learning model comprises a learning-based scheduler, and wherein the scheduling-related parameter comprises at least one of a remaining latency budget, a buffer status, or a power headroom.

15. The processor of claim 13, wherein the at least one controller is further configured to cause the processor to:

determine a reference time; and determine the second scheduling-related parameter value based at least in part on the first signaling and the reference time.

16. The processor of claim 13, wherein the at least one controller is further configured to cause the processor to:

receive a second signaling that requests a delay status report; and transmit the delay status report regardless of whether data units associated with the delay status report have been discarded.

17. The processor of claim 13, wherein the report includes at least one of:

a buffer size associated with a logical channel group, a remaining time associated with one or more packet data convergence protocol (PDCP) discardTimers among service data units (SDUs) buffered for the logical channel group, or a difference between a nominal user equipment (UE) maximum transmit power and an estimated power for an uplink (UL) transmission in an activated serving cell.

18. A method performed by a user equipment (UE), the method comprising:

receiving a first signaling indicating a first value for a scheduling-related parameter for a learning model;

determining a second value for the scheduling-related parameter, and in response to a difference between the first value of the scheduling-related parameter and the second value of the scheduling-related parameter satisfying a threshold value, at least one of triggering a report associated with the first scheduling-related parameter, or transmitting a second signaling indicating a result of a function of the first value of the scheduling-related parameter and the second value of the scheduling-related parameter.

19. A base station for wireless communication, comprising:

at least one memory; and at least one processor coupled with the at least one memory and configured to cause the base station to:

transmit a first signaling indicating a first value for a scheduling-related parameter for a learning model;

receive a second signaling indicating a result of a function of the first value of the scheduling-related parameter and a second value of the scheduling-related parameter.

20. The base station of claim 19, wherein the function of the first value of the scheduling-related parameter and the second value of the scheduling-related parameter is an absolute value of a difference between the first value of the scheduling-related parameter and the second value of the scheduling-related parameter.

* * * * *